United States Patent
Lei et al.

(10) Patent No.: US 10,958,905 B2
(45) Date of Patent: Mar. 23, 2021

(54) INFORMATION PROCESSING APPARATUS, MOVING IMAGE ENCODING METHOD, AND COMPUTER-READABLE RECORDING MEDIUM RECORDING MOVING IMAGE ENCODING PROGRAM

(71) Applicant: FUJITSU LIMITED, Kawasaki (JP)

(72) Inventors: Xuying Lei, Kawasaki (JP); Hidenobu Miyoshi, Kawasaki (JP); Shunsuke Kobayashi, Fukuoka (JP); Kazuhiro Yamashita, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/775,310

(22) Filed: Jan. 29, 2020

(65) Prior Publication Data

US 2020/0252607 A1 Aug. 6, 2020

(30) Foreign Application Priority Data

Feb. 4, 2019 (JP) .............................. JP2019-018157

(51) Int. Cl.
*H04N 7/12* (2006.01)
*H04N 19/115* (2014.01)
(Continued)

(52) U.S. Cl.
CPC ......... *H04N 19/115* (2014.11); *H04N 19/146* (2014.11); *H04N 19/177* (2014.11)

(58) Field of Classification Search
CPC ..... E04B 9/18; E04F 13/0805; H04N 19/115; H04N 19/146; H04N 19/17
(Continued)

(56) References Cited

U.S. PATENT DOCUMENTS 8,811,472 B2 *  8/2014 Nakagomi ........... H04N 19/149
                                                    375/240.02
2002/0131492 A1    9/2002 Yokoyama
(Continued)

FOREIGN PATENT DOCUMENTS

JP    2000-232644 A    8/2000
JP    2002-232882 A    8/2002
JP    2008-85673 A     4/2008

OTHER PUBLICATIONS

Pages 1-6Chongyi et al., Multiple moving targets real-time detection in single-channel SAR using median filter, 2008, IEEE.*
(Continued)

*Primary Examiner* — Gims S Philippe
(74) *Attorney, Agent, or Firm* — Fujitsu Patent Center

(57) ABSTRACT

An information processing apparatus includes: a memory; and a processor coupled to the memory and configured to: down-convert a moving image in units of structure of pictures (SOPs) divided in a time direction and precedingly execute encoding processing; calculate a target code amount of each processing unit included in the moving image in units of SOPs based on a result of the preceding encoding processing and calculate a temporal buffer position in a case where the encoding processing is executed on each processing unit based on the calculated target code amount; and calculate an error between an actual transmission buffer position and a temporal buffer position each time when the encoding processing is executed on each processing unit in the moving image in units of SOPs and correct a target code amount of each processing unit on which the encoding processing has not been executed yet.

10 Claims, 25 Drawing Sheets

(51) Int. Cl.
*H04N 19/146* (2014.01)
*H04N 19/177* (2014.01)

(58) Field of Classification Search
USPC .................................................. 375/240.02
See application file for complete search history.

(56) References Cited

U.S. PATENT DOCUMENTS

| | | | |
|---|---|---|---|
| 2008/0075164 A1 | 3/2008 | Matsumura | |
| 2008/0304564 A1* | 12/2008 | Kim | H04N 19/174 |
| | | | 375/240.03 |
| 2011/0149110 A1* | 6/2011 | Sugiyama | H04N 9/04515 |
| | | | 348/223.1 |
| 2011/0164679 A1* | 7/2011 | Satou | H04N 19/146 |
| | | | 375/240.03 |
| 2016/0127728 A1* | 5/2016 | Tanizawa | H04N 19/30 |
| | | | 375/240.02 |
| 2018/0343471 A1* | 11/2018 | Jacobson | H04N 19/1883 |
| 2019/0200053 A1* | 6/2019 | Van Veldhuisen | |
| | | | H04N 21/2662 |
| 2019/0261010 A1* | 8/2019 | Luo | H04N 19/40 |
| 2019/0289296 A1* | 9/2019 | Kottke | H04N 19/115 |

OTHER PUBLICATIONS

Chida, Kazuhiro et al., "Development of 8K120Hz Real-time Video Codec", 2018 ITE annual convention, No. 22C-1, Aug. 2018, 2 pages, with English Abstract.

Lei, Xuying et al., "Development of High Efficient and High Picture Quality Architecture for 8K 120Hz Video Encoder with HEVC", 2018 ITE annual convention, No. 22C-2, Aug. 2018, 2 pages, with English Abstract.

Sugito, Yasuko et al., "A Study on the Required Video Bit-rate for 8K 120-Hz HEVC/H.265 Temporal Scalable Coding", 2018 Picture Coding Symposium(PCS), San Francisco, CA, pp. 106-110, 2018.

* cited by examiner

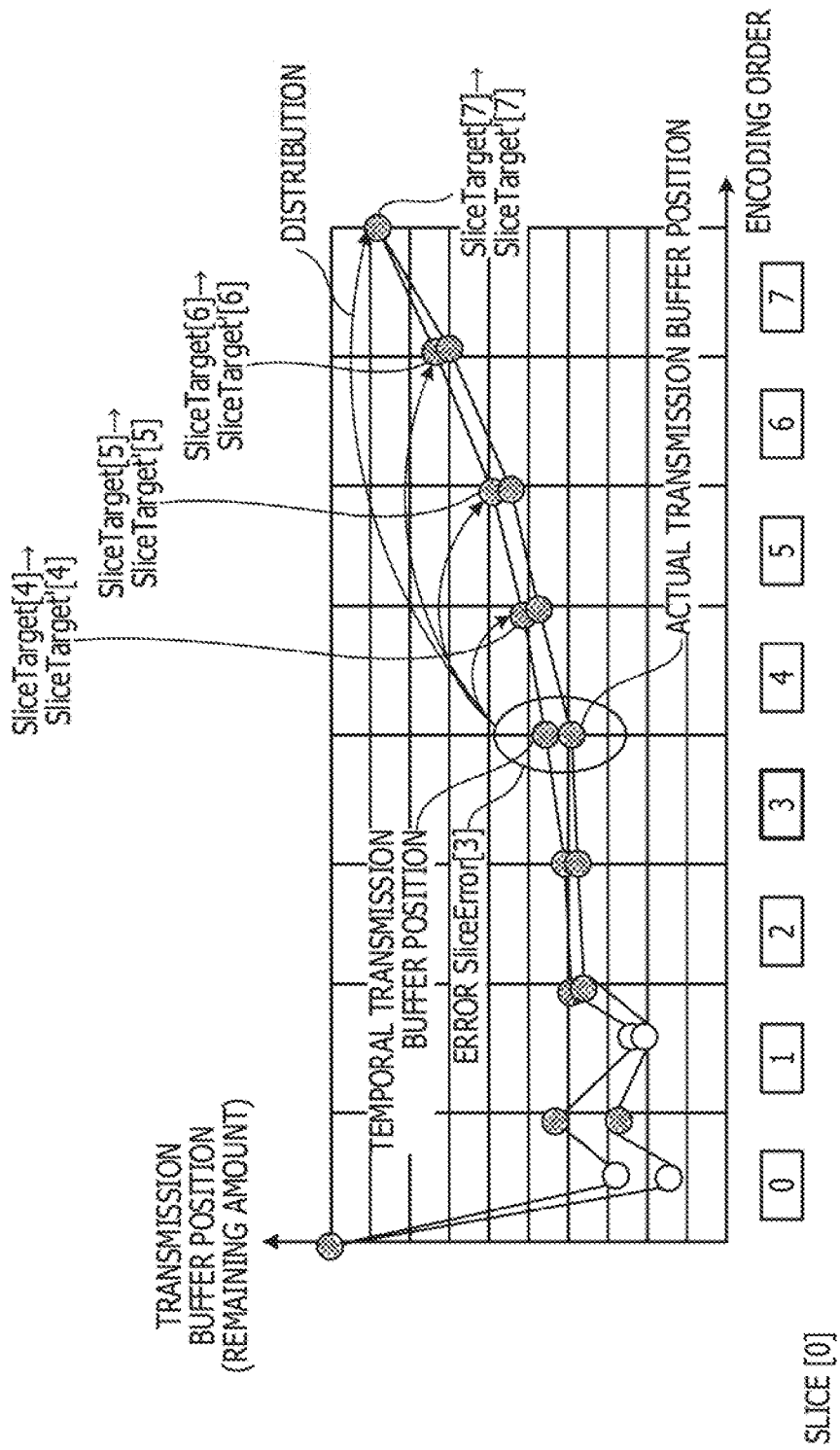

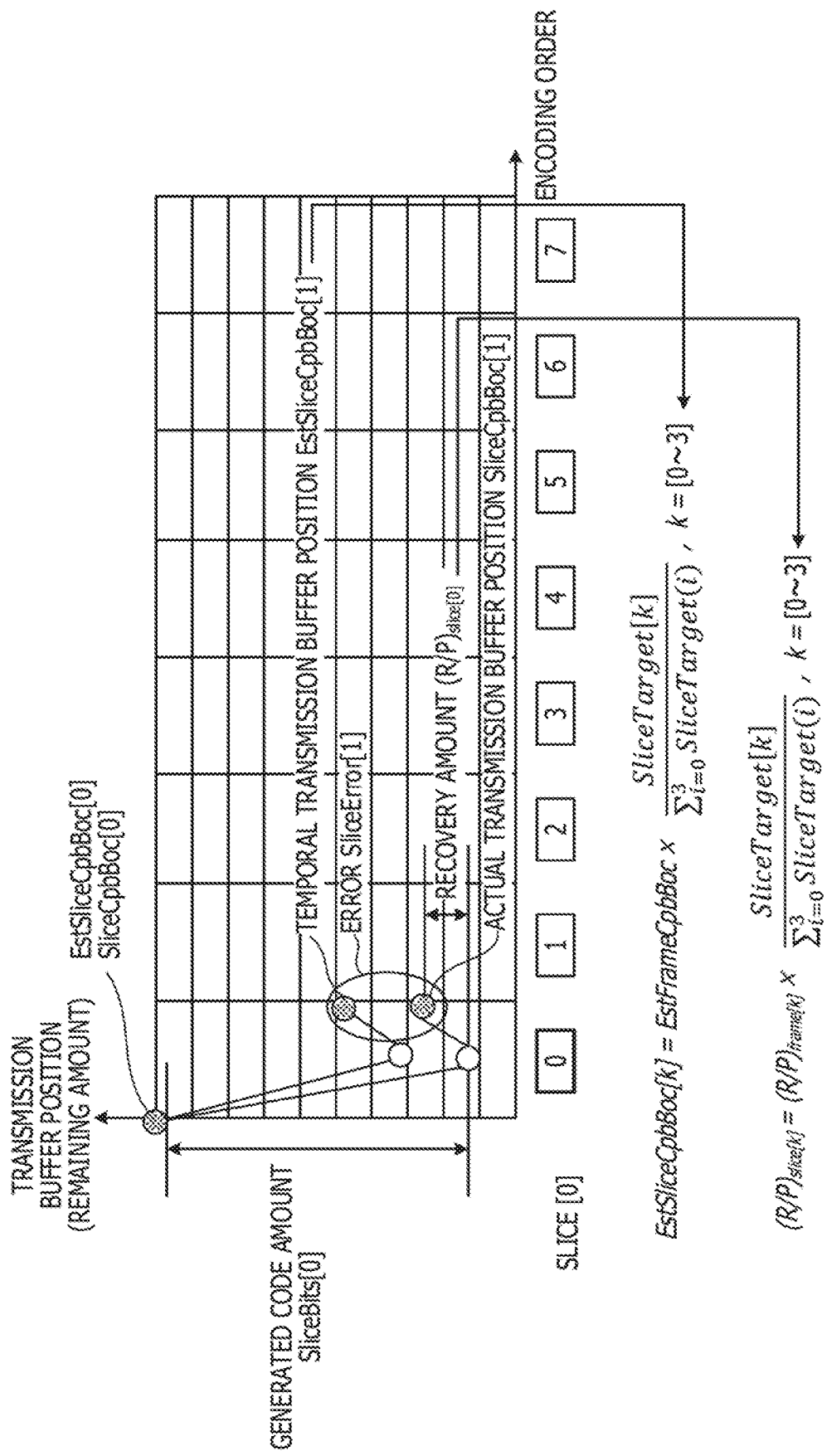

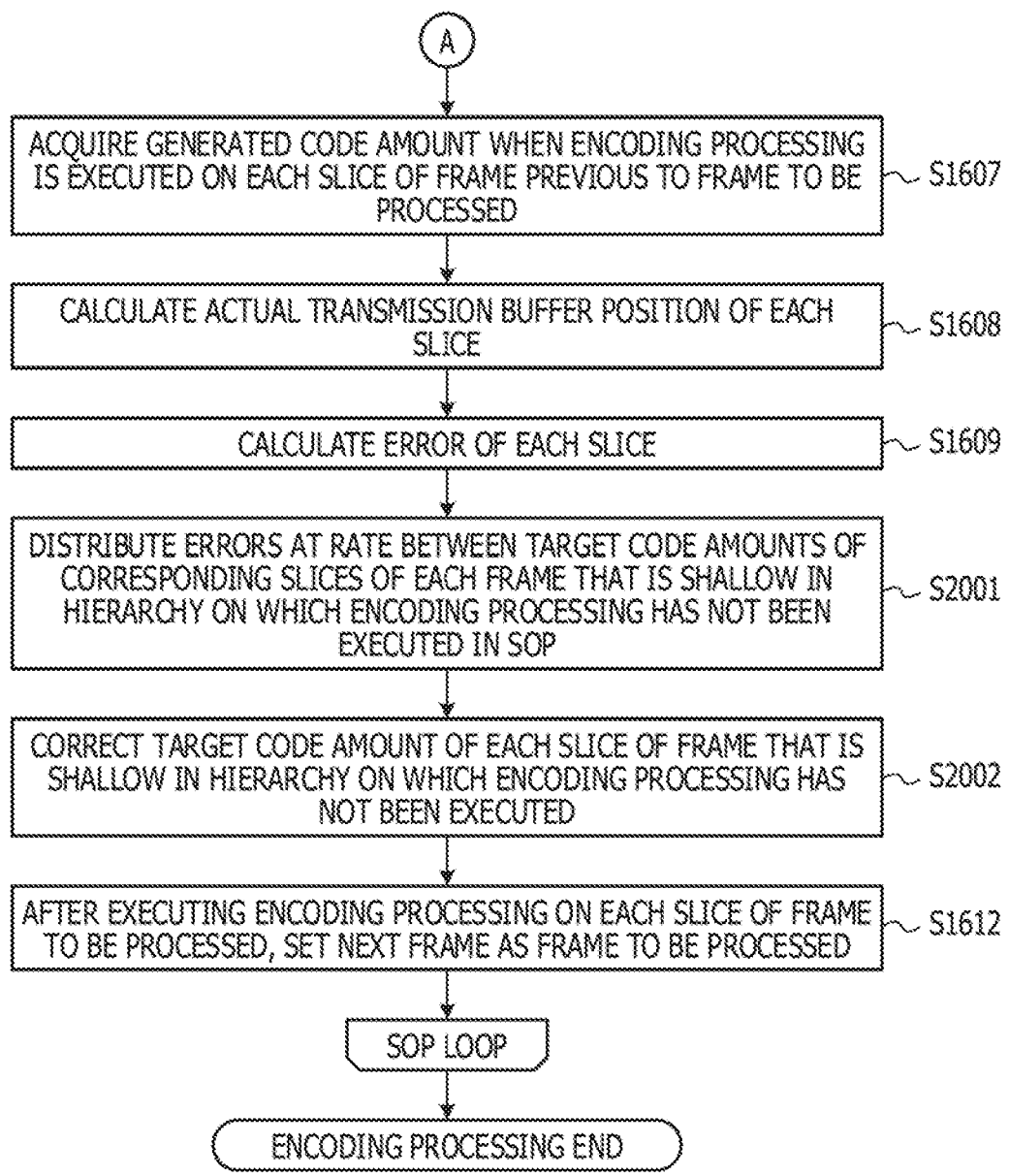

INFORMATION PROCESSING APPARATUS, MOVING IMAGE ENCODING METHOD, AND COMPUTER-READABLE RECORDING MEDIUM RECORDING MOVING IMAGE ENCODING PROGRAM

CROSS-REFERENCE TO RELATED APPLICATION

This application is based upon and claims the benefit of priority of the prior Japanese Patent Application No. 2019-18157, filed on Feb. 4, 2019, the entire contents of which are incorporated herein by reference.

FIELD

The present embodiments relate to a moving image encoding apparatus, a moving image encoding method, and a moving image encoding program.

BACKGROUND

A moving image encoding apparatus has been developed which divides an 8K-120 Hz moving image in a time direction and a spatial direction and executes encoding processing in real time by executing processing in parallel by using a plurality of encoders, and transmits a bit stream.
Japanese Laid-open Patent Publication No. 2008-085673, Japanese Laid-open Patent Publication No. 2000-232644, and Japanese Laid-open Patent Publication No. 2002-232882 are disclosed as related art.
Non-Patent Document 1: "Development of 8K120 Hz Real-time Video Codec", 2018 ITE annual convention, no. 22C-1, August 2018,
Non-Patent Document 2: "Development of High Efficient and High Picture Quality Architecture for 8K 120 Hz Video Encoder with HEVC", 2018 ITE annual convention, no. 22C-2, August 2018, and
Non-Patent Document 3: "A Study on the Required Video Bit-rate for 8K 120-Hz HEVC/H.265 Temporal Scalable Coding," 2018 Picture Coding Symposium (PCS), San Francisco. Calif., pp. 106-110, 2018 are disclosed as related art.

SUMMARY

According to an aspect of the embodiments, an information processing apparatus includes: a memory; and a processor coupled to the memory and configured to: down-convert a moving image in units of structure of pictures (SOPs) divided in a time direction and precedingly execute encoding processing; calculate a target code amount of each processing unit included in the moving image in units of SOPs based on a result of the preceding encoding processing and calculate a temporal buffer position in a case where the encoding processing is executed on each processing unit based on the calculated target code amount; and calculate an error between an actual transmission buffer position and a temporal buffer position each time when the encoding processing is executed on each processing unit in the moving image in units of SOPs and correct a target code amount of each processing unit on which the encoding processing has not been executed yet.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 15A and 15B are first diagrams illustrating a specific example of correction processing by using the second correction method of the target code amount in units of slices;
FIGS. 17A and 17B are diagrams illustrating a specific example of a temporal transmission buffer position of the slice [0] and a specific example of an actual transmission buffer position of the slice [0]

FIGS. 20A and 20B are a flowchart illustrating a flow of encoding processing by the moving image encoding apparatus according to the third embodiment.

DESCRIPTION OF EMBODIMENTS

Figure 1:
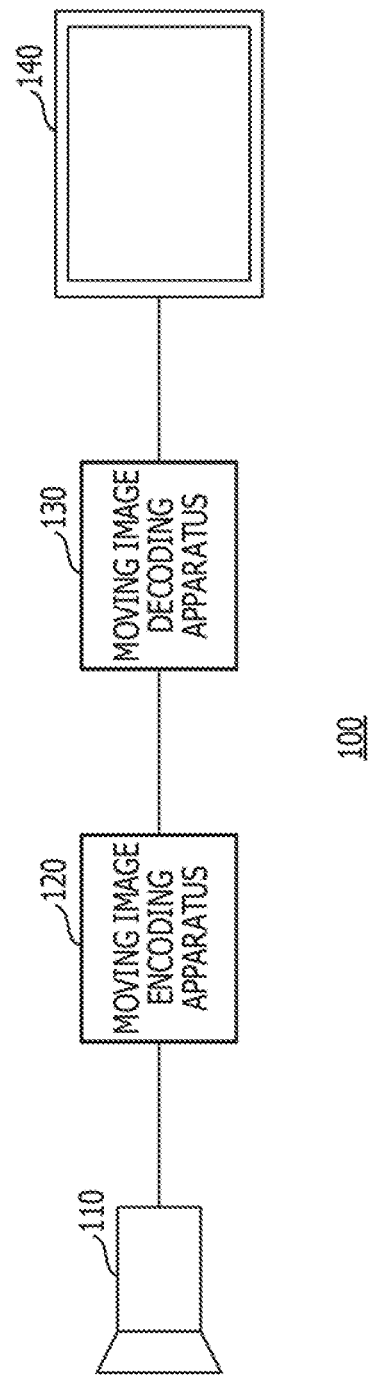
FIG. 1 is a diagram illustrating an application example of a moving image encoding apparatus according to a first embodiment.

In the moving image encoding apparatus, a rate controller calculates a target code amount of each frame in units of structure of pictures (SOP) so as not to generate an underflow or an overflow in a transmission buffer that holds a bit stream to be transmitted. Then, each encoder executes the encoding processing on each frame while controlling a generated code amount based on the calculated target code amount.

However, the target code amount may not coincide with an actual generated code amount. For example, if a state is continued where the actual generated code amount is larger than the target code amount and the errors are accumulated, the underflow is generated in the transmission buffer.

An encoding processing on a moving image may be controlled so as not to generate an underflow in a buffer.

Hereinafter, each embodiment will be described with reference to the attached drawings. Note that, in the description and the drawings, components having substantially the same functional configuration are denoted by the same reference numerals, and redundant description is omitted.

First Embodiment

<Application Example of Moving Image Encoding Apparatus>

First, an application example of a moving image encoding apparatus according to a first embodiment will be described. FIG. 1 is a diagram illustrating the application example of the moving image encoding apparatus according to the first embodiment. As illustrated in FIG. 1, a moving image encoding apparatus 120 according to the first embodiment is applied to, for example, a video display system 100, encodes an 8K-120 Hz moving image generated by an imaging device 110 in real time, and transmits a bit stream to a moving image decoding apparatus 130. The moving image decoding apparatus 130 decodes the bit stream transmitted by the moving image encoding apparatus 120 and outputs the decoded bit stream to a video display apparatus 140. With this operation, the video display apparatus 140 can display an 8K-120 Hz video.

<Hardware Configuration of Moving Image Encoding Apparatus>

Figure 2A:
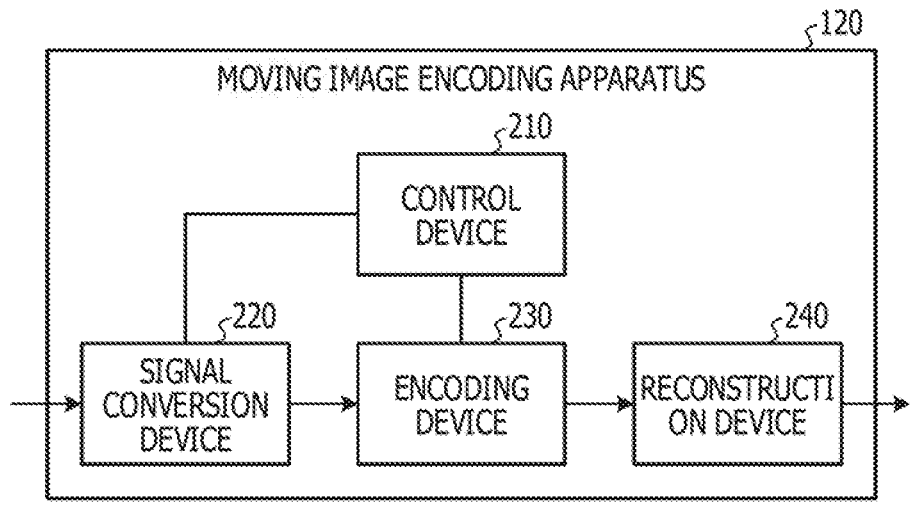
FIGS. 2A and 2B are diagrams illustrating an exemplary hardware configuration of the moving image encoding apparatus according to the first embodiment.
Figure 2B:
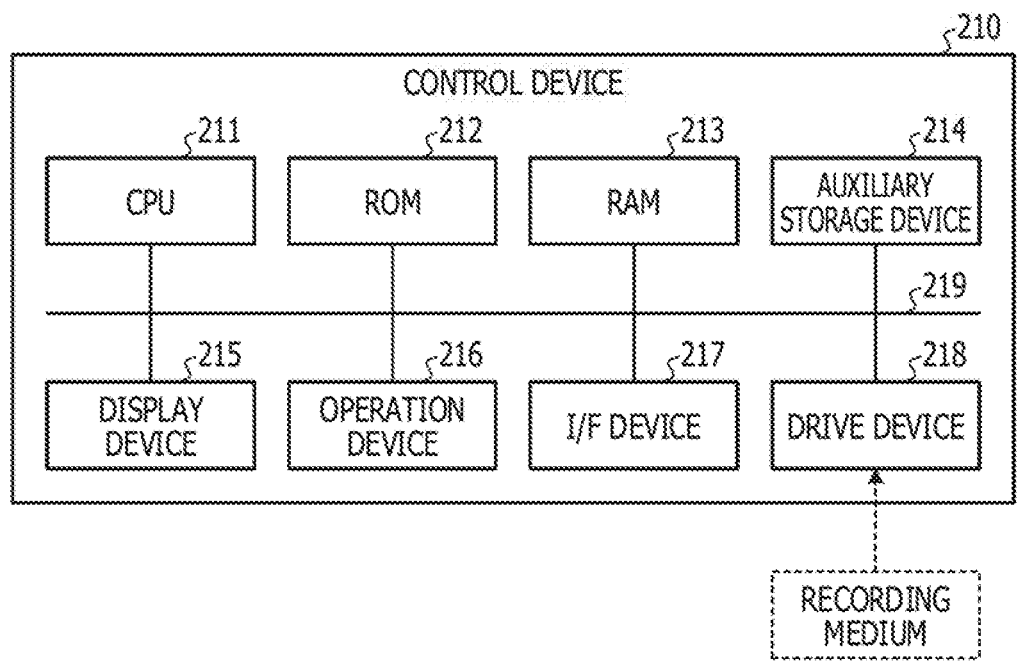

Next, a hardware configuration of the moving image encoding apparatus 120 will be described. FIGS. 2A and 2B are diagrams illustrating an exemplary hardware configuration of the moving image encoding apparatus according to the first embodiment. As illustrated in FIG. 2A, the moving image encoding apparatus 120 includes a control device 210, a signal conversion device 220, an encoding device 230, and a reconstruction device 240.

Among these devices, details of hardware configurations of the signal conversion device 220, the encoding device 230, and the reconstruction device 240 will be omitted, and here, details of a hardware configuration of the control device 210 will be described. FIG. 2B is a diagram illustrating the details of the hardware configuration of the control device 210.

As illustrated in FIG. 2B, the control device 210 includes a central processing unit (CPU) 211, a read only memory (ROM) 212, and a random access memory (RAM) 213. The CPU 211, the ROM 212, and the RAM 213 form a so-called computer.

Furthermore, the control device 210 includes an auxiliary storage device 214, a display device 215, an operation device 216, an interface (I/F) device 217, and a drive device 218. Note that each hardware of control device 210 is connected to each other via a bus 219.

The CPU 211 is an arithmetic device that executes various programs installed in the auxiliary storage device 214 (for example, moving image encoding program and the like to be described later).

The ROM 212 is a nonvolatile memory. The ROM 212 functions as a main storage device that stores various programs, data, and the like needed for executing various programs installed in the auxiliary storage device 214 by the CPU 211. For example, the ROM 212 functions as a main storage device that stores a boot program and the like such as basic input/output system (BIOS) or extensible firmware interface (EFI).

The RAM 213 is a volatile memory such as a dynamic random access memory (DRAM) or a static random access memory (SRAM).

The RAM 213 functions as a main storage device that provides a work region developed when various programs installed in the auxiliary storage device 214 are executed by the CPU 211.

The auxiliary storage device 214 is an auxiliary storage device that stores various programs. The display device 215 is a display device that displays an internal state of the control device 210. The operation device 216 is an input device used for inputting various instructions to the control device 210. The I/F device 217 is a connection device that transmits and receives signals to/from the signal conversion device 220 and the encoding device 230.

The drive device 218 is a device used to set a computer-readable recording medium. The recording medium referred here includes a medium for optically, electrically, or magnetically recording information, such as a CD-ROM, a flexible disk, or a magneto-optical disk. Alternatively, the recording medium may include a semiconductor memory or the like that electrically records information, such as a ROM or a flash memory.

Note that various programs installed in the auxiliary storage device 214 may be installed, for example, by setting the distributed recording medium in the drive device 218 and reading various programs recorded in the recording medium by the drive device 218.

<Details of Function of Moving Image Encoding Apparatus>

Next, details of a function of the moving image encoding apparatus 120 will be described. However, in the following, a function of a moving image encoding apparatus according to a comparative example will be described first, and a problem in a case where the moving image encoding apparatus according to the comparative example is used will be described ((1) below). Thereafter, details of the moving image encoding apparatus 120 according to the first embodiment will be described with a focus on a function for solving the problem ((2) below).

Figure 3:
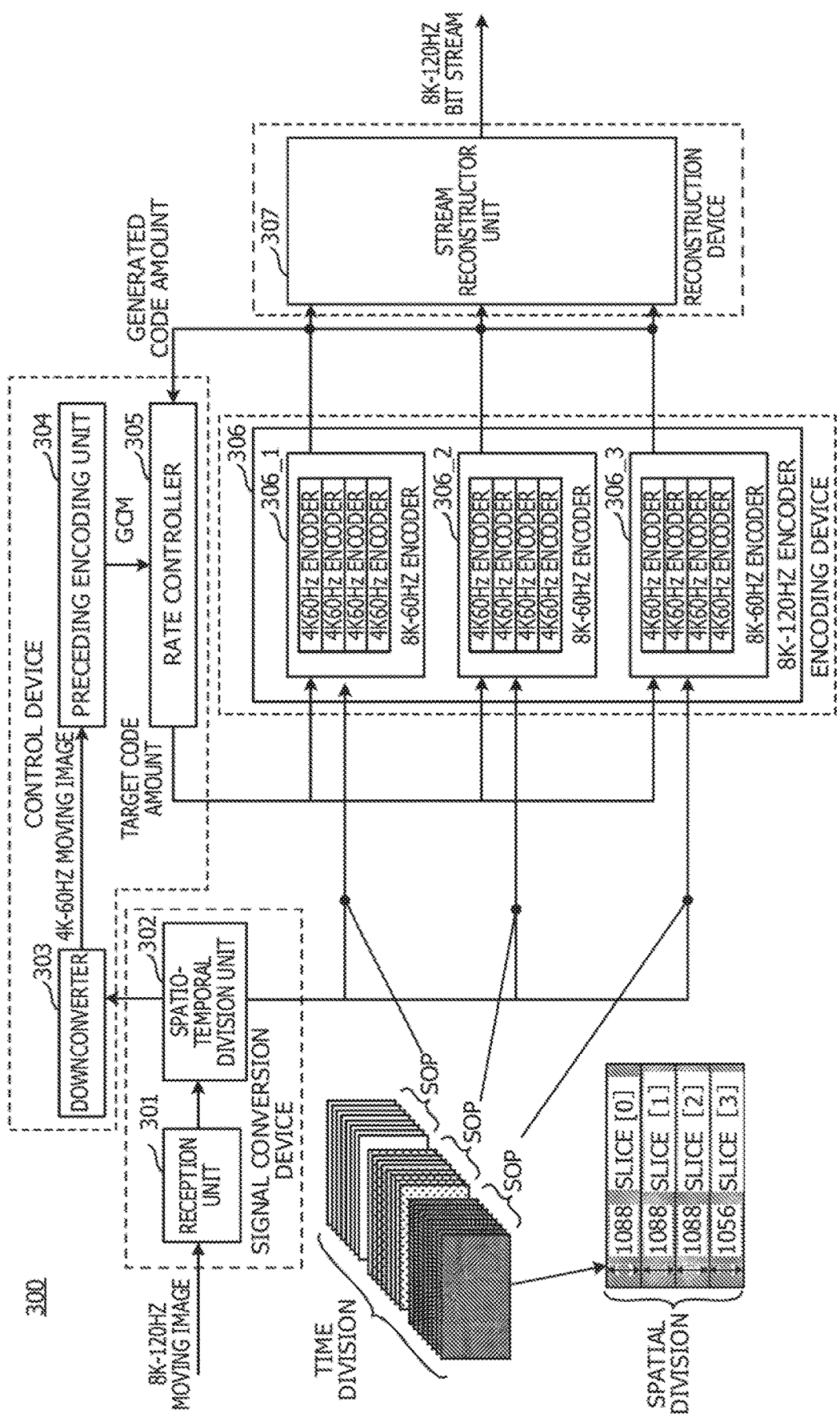
FIG. 3 is a diagram illustrating an exemplary functional configuration of a moving image encoding apparatus according to a comparative example.

(1) Description of Function of Moving Image Encoding Apparatus According to Comparative Example (1-1) Functional Configuration of Moving Image Encoding Apparatus According to Comparative Example First, a functional configuration of the moving image encoding apparatus according to the comparative example will be described. FIG. 3 is a diagram illustrating an exemplary functional configuration of the moving image encoding apparatus according to the comparative example. As illustrated in FIG. 3, a moving image encoding apparatus 300 according to the comparative example includes a reception unit 301, a Spatio-Temporal division unit 302, a downconverter 303, a preceding encoding unit 304, a rate controller 305, an 8K-120 Hz encoder 306, and a stream reconstructor unit 307. Note that a dotted line surrounding each functional block indicates hardware (refer to FIGS. 2A and 2B) that implements each functional block.

The reception unit 301 receives an 8K-120 Hz moving image generated by the imaging device 110.

The Spatio-Temporal division unit 302 divides the 8K-120 Hz moving image in a time direction and a spatial direction (time division and space division) and inputs the divided images to a plurality of 4K-60 Hz encoders.

The example in FIG. 3 illustrates a state where the Spatio-Temporal division unit 302 time-divides 24 consecutive frames in a moving image into three SOPs including eight frames and inputs the respective SOPs to 8K-60 Hz encoders 306_1 to 306_3.

Furthermore, the example in FIG. 3 illustrates a state where the Spatio-Temporal division unit 302 space-divides each frame included in each SOP into four and respectively and separately inputs the divided frames to the four 4K-60 Hz encoders included in the 8K-60 Hz encoder.

Note that the Spatio-Temporal division unit 302 performs time division according to a shape based on association of radio industries and business (ARIB) standard. Each region obtained by performing the time division by the Spatio-Temporal division unit 302 is referred to as a "slice" below. Furthermore, in the present embodiment, four slices obtained by performing the time division by the Spatio-Temporal division unit 302 are referred to as a slice [0], a slice [1], a slice [2], and a slice [3]. The example in FIG. 3 illustrates that the number of pixels in the vertical direction of the slice [0] to slice [2] is "1088" and the number of pixels in the vertical direction of the slice [3] is "1056".

The downconverter 303 generates a 4K-60 Hz moving image by down-converting the 8K-120 Hz moving image on which the time division and the space division are performed by the Spatio-Temporal division unit 302 (with this operation, four frames are included in each SOP).

The preceding encoding unit 304 executes encoding processing on the four slices included in each of the four frames in each SOP and calculates global complexity measure (GCM) in units of slices from the encoding result. Note that the GCM is calculated by a product of a quantization step (Quant) and a generated code amount (bits).

The preceding encoding unit 304 estimates a GCM of each slice of each frame of one SOP of the 8K-120 Hz moving image based on the calculated GCM (GCM of each slice of each frame of one SOP of 4K-60 Hz moving image). Moreover, the preceding encoding unit 304 notifies the estimated GCM of the rate controller 305.

Note that, in the example in FIG. 3, the downconverter 303 and the preceding encoding unit 304 are separately provided. However, the downconverter 303 may be provided as a part of the preceding encoding unit 304.

The rate controller 305 calculates a target code amount of each frame of the one SOP and a temporal transmission buffer position (remaining amount) of each frame of the one SOP based on the GCM of each slice of each frame of the one SOP of the 8K-120 Hz moving image notified by the preceding encoding unit 304.

Here, the transmission buffer position indicates a remaining amount of a buffer that holds a bit stream on which the encoding processing is executed by the 4K-60 Hz encoder (for example, transmission buffer provided in reconstruction device). In the transmission buffer position, a transmission buffer position that is calculated before the encoding processing in advance is referred to as a "temporal transmission buffer position", and a transmission buffer position that is calculated based on the generated code amount after the encoding processing is referred to as an "actual transmission buffer position".

Note that a method for calculating the transmission buffer position (remaining amount) will be described in detail in (1-3) below, and a method for calculating the target code amount of each frame will be described in detail in (1-4) below.

Furthermore, the rate controller 305 divides the calculated target code amount of each frame of the one SOP into slices based on a rate of the GCMs of the respective four slices included in each frame of the one SOP and calculates a target code amount of each slice of each frame of the one SOP.

Furthermore, the rate controller 305 notifies the target code amount of each slice of each frame of the one SOP of a corresponding 4K-60 Hz encoder. For example, the rate controller 305 notifies the target code amount of each slice of each frame of the one SOP of each of the four 4K-60 Hz encoders included in the 8K-60 Hz encoder 306_1.

Furthermore, the rate controller 305 receives feedback regarding the generated code amount when the encoding processing is executed on each slice of each frame of the one SOP from each of the four corresponding 4K-60 Hz encoders. Then, the rate controller 305 adds the received generated code amounts in units of frames and calculates the actual transmission buffer position of each frame.

For example, the rate controller 305 receives feedback regarding the generated code amount when the encoding processing is executed on each slice of each frame from each of the four 4K-60 Hz encoders included in the 8K-60 Hz encoder 306_1. Then, the rate controller 305 calculates the actual transmission buffer position of each frame.

The 8K-120 Hz encoder 306 includes the 8K-60 Hz encoders 306_1 to 306_3. By executing the encoding processing by the 8K-60 Hz encoders 306_1 to 306_3 in parallel, the 8K-120 Hz encoder 306 can encode the 8K-120 Hz moving image in real time.

Furthermore, each of the 8K-60 Hz encoders 306_1 to 306_3 includes four 4K-60 Hz encoders. By executing the encoding processing by the four 4K-60 Hz encoders in parallel, each of the 8K-60 Hz encoders 306_1 to 306_3 can encode an 8K-60 Hz moving image in real time.

The 4K-60 Hz encoder executes the encoding processing on each slice of each frame of the one SOP while controlling the generated code amount based on the target code amount of each slice of each frame of the one SOP notified from the rate controller 305.

The stream reconstructor unit 307 combines bit streams respectively output from the 8K-60 Hz encoders 306_1 to 306_3 so as to generate and transmit an 8K-120 Hz bit stream.

(1-2) Relationship between Frames in SOP at The Time of Encoding Processing

Figure 4:
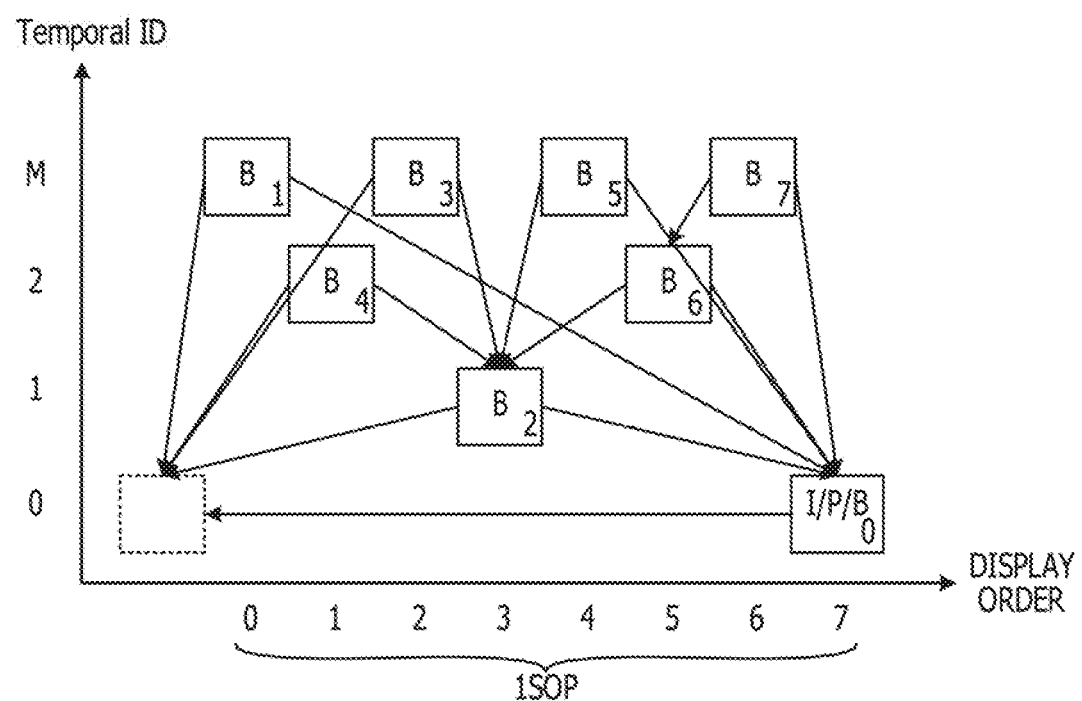
FIG. 4 is a diagram for explaining a relationship between each frames in an SOP at the time of encoding processing.

Next, a relationship between the frames in the SOP at the time when the 4K-60 Hz encoder included in each of the 8K-60 Hz encoders 306_1 to 306_3 executes the encoding processing will be described. FIG. 4 is a diagram for explaining a relationship between the each frames in the SOP at the time of the encoding processing. In FIG. 4, the horizontal axis indicates a display order of each frame (eight frames) included in the one SOP, and the vertical axis indicates a Temporal ID (TID) that identifies a hierarchy of each frame (upper side indicates deeper hierarchy, and lower side indicates shallower hierarchy). Furthermore, a reference "I" indicates an intra (I) picture, a reference "P" indicates a predictive (P) picture, and a reference "B" indicates a B picture.

Furthermore, each rectangle illustrated in FIG. 4 (each rectangle including character of "B") represents each frame included in one SOP, and a number on the lower right side of "B" indicates an encoding (or decoding) order. Moreover, an arrow extending from each rectangle indicates a frame that is referred, when the encoding processing is executed, by the frame represented by each rectangle.

For example, a frame represented by a rectangle including characters of "$B_1$" indicates a frame which is a 0-th frame in the display order and a first frame in the encoding order. Furthermore, the frame represented by a rectangle including the characters of "B1" indicates that one or both of a seventh frame in the display order included in the previous SOP (frame represented by rectangle including characters of "$I/P/B_0$") and a seventh frame in the display order included in the same SOP (frame represented by rectangle including characters of "$I/P/B_0$") are referred at the time of the encoding processing.

(1-3) Description of Transmission Buffer Position

Figure 5:
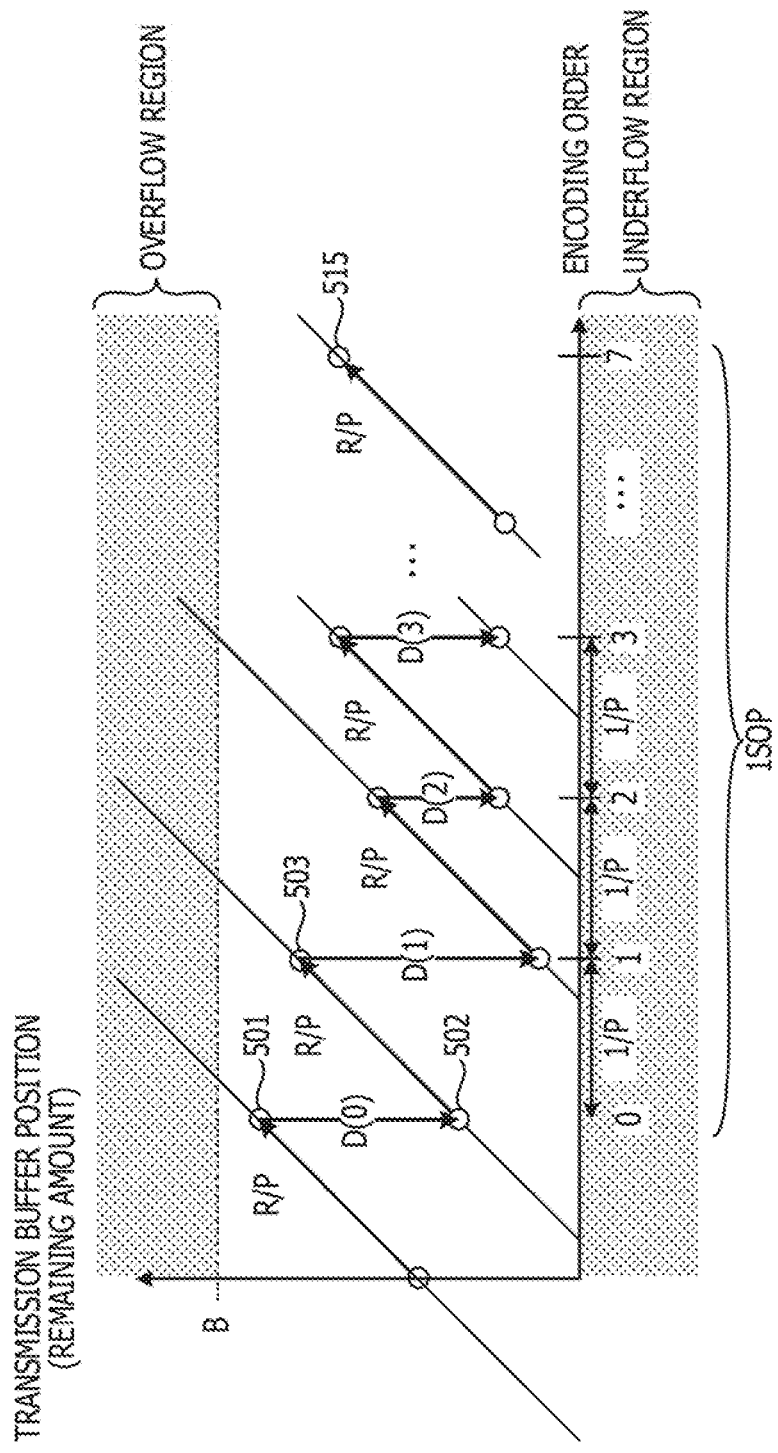
FIG. 5 is a diagram for explaining a transmission buffer position.

Next, the transmission buffer position (remaining amount) will be described. FIG. 5 is a diagram for explaining the transmission buffer position. In FIG. 5, the horizontal axis indicates an encoding order of each frame included in one SOP, and the vertical axis indicates a position (remaining amount) of a transmission buffer.

Furthermore, in FIG. 5, a reference "R" indicates a bit rate [bit/second], a reference "P" indicates a frame rate [Hz], and a reference "B" indicates a capacity of a transmission buffer [bit]. Moreover, a reference "D(n)" indicates a generated code amount [bit] of an n-th frame in the encoding order. Note that, here, it is assumed that "R" be fixed (CBR: constant bit rate).

As illustrated in FIG. 5, for example, in a case where the 8K-60 Hz encoder 306_1 executes the encoding processing on each frame of one SOP, an actual transmission buffer position of each frame shifts along the arrow.

For example, before the encoding processing is started on the frame which is the 0-th frame in the encoding order, the actual transmission buffer position is a position indicated by a reference 501. When the encoding processing is executed, the position moves downward by a generated code amount (D(0)) and shifts to a position indicated by a reference 502.

Thereafter, before the encoding processing is started on a first frame in the encoding order, the actual transmission buffer position moves upward by a buffer recovery amount (R/P) and shifts to a position indicated by a reference 503. Thereafter, by repeating similar processing, the actual transmission buffer position shifts upward and downward, and by executing the encoding processing on all the frames in one SOP, the transmission buffer position shifts to a position indicated by a reference 515.

Here, in the description of FIG. 5, by replacing the generated code amount D(n) of the n-th frame in the encoding order with the target code amount of the n-th frame in the encoding order, the positions indicated by the references 501, 503, and 515 represent temporal transmission buffer positions of the respective frames.

Note that, in the present embodiment, the position indicated by the reference 501 is referred to as a head actual transmission buffer position of one SOP (or head temporal transmission buffer position of one SOP). Furthermore, the position indicated by the reference 515 is referred to as an end actual transmission buffer position of one SOP (or end temporal transmission buffer position of one SOP).

The rate controller 305 calculates a target code amount of each frame of one SOP so that the actual transmission buffer position (remaining amount) is not included in an overflow region and an underflow region. With this operation, as long as the generated code amount D(n) of each frame coincides with the target code amount of each frame, the rate controller 305 can control the encoding processing without generating an overflow or an underflow in the transmission buffer.

On the other hand, if a state is continued where the generated code amount D(n) of each frame does not coincide with the target code amount of each frame and the generated code amount D(n) is smaller than the transmission buffer recovery amount R/P, the overflow is generated in the transmission buffer. Note that, in a case where the overflow is generated in the transmission buffer, the moving image decoding apparatus 130 copes with the overflow by inserting dummy data for a shortage of the generated code amount.

Furthermore, if a state is continued where the generated code amount D(n) of each frame does not coincide with the target code amount of each frame and the generated code amount D(n) is larger than the transmission buffer recovery amount R/P, the underflow is generated in the transmission buffer. Note that, in a case where the underflow is generated in the transmission buffer, it is not possible for the moving image decoding apparatus 130 to recover an excess of the generated code amount. Therefore, the rate controller 305 needs to calculate the target code amount of each frame so as not to generate the underflow in the transmission buffer.

(1-4) Feedback Control by Moving Image Encoding Apparatus According to Comparative Example However, the target code amount of each frame does not necessarily coincide with the generated code amount D(n) of each frame, and an error is generated between the temporal transmission buffer position and the actual transmission buffer position. Therefore, the moving image encoding apparatus 300 according to the comparative example feeds back the generated code amount as described above and calculates the actual transmission buffer position so as to suppresses an accumulation of the errors.

Figure 6:
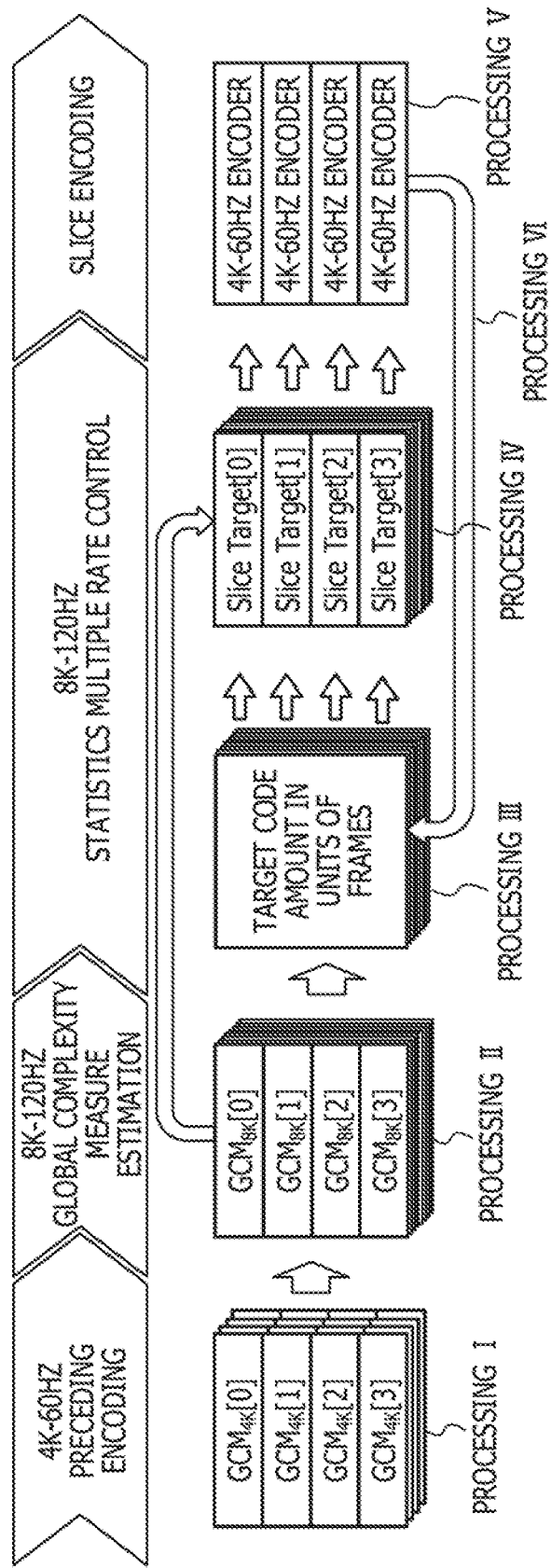
FIG. 6 is a diagram for explaining feedback control in encoding processing by the moving image encoding apparatus according to the comparative example.

Therefore, hereinafter, the feedback control in the encoding processing by the moving image encoding apparatus 300 according to the comparative example will be described. FIG. 6 is a diagram for explaining the feedback control in the encoding processing by the moving image encoding apparatus according to the comparative example.

As described above, the preceding encoding unit 304 calculates the GCM of each of the four slices by precedingly encoding the 4K-60 Hz moving image (four frames) obtained by down-converting the 8K-120 Hz moving image for one SOP (processing I in FIG. 6). In the example in FIG. 6, the calculated GCMs of the respective four slices are referred to as $GCM_{4K}[0]$ to $GCM_{4K}[3]$. Note that, in the example in FIG. 6, the GCMs of the respective four slices of only the frontmost frame are illustrated. However, the GCM of each of the four slices is similarly calculated for the remaining three frames.

Subsequently, a GCM of the 8K-120 Hz moving image is estimated by the preceding encoding unit 304 based on the calculated GCMs of the respective four slices (processing II in FIG. 6). In the example in FIG. 6, the estimated GCMs of the respective four slices are referred to as $GCM_{8K}[0]$ to $GCM_{8K}[3]$. Note that, in the example in FIG. 6, the GCMs of the respective four slices of only the frontmost frame are illustrated. However, the GCM of each of the four slices is similarly estimated for the remaining seven frames.

Subsequently, the rate controller 305 calculates the target code amount in units of frames and the temporal transmission buffer position of each frame based on each GCM of the 8K-120 Hz moving image (processing III in FIG. 6). Note that, in the example in FIG. 6, the target code amount of only the frontmost frame is illustrated. However, it is assumed that the target code amount is similarly calculated for the remaining seven frames.

Subsequently, the rate controller 305 calculates the target code amount of each slice based on the target code amount in units of frames and a rate of each GCM estimated in units of slices (processing IV in FIG. 6). In the example in FIG. 6, the calculated target code amounts of the four slices are referred to as SliceTarget[0] to SliceTarget[3]. Note that, in the example in FIG. 6, the target code amounts of the four slices of only the frontmost frame are illustrated. However the target code amounts of four slices are similarly calculated for the remaining seven frames.

Subsequently, the rate controller 305 notifies the target code amounts of four slices for one SOP (for eight frames) of each corresponding 4K-60 Hz encoder. Then, each 4K-60 Hz encoder executes the encoding processing on each slice of each frame based on the notified target code amount in units of slices (processing V in FIG. 6). Then, each 4K-60 Hz encoder feeds back the generated code amount of each slice at the time when the encoding processing is executed to the rate controller 305 (processing VI in FIG. 6). With this operation, the rate controller 305 calculates the actual transmission buffer position in units of frames based on the fed back generated code amount and reflects the calculated position to the calculation of the target code amount in units of frames so as to suppress the accumulation of the errors.

Figure 7:
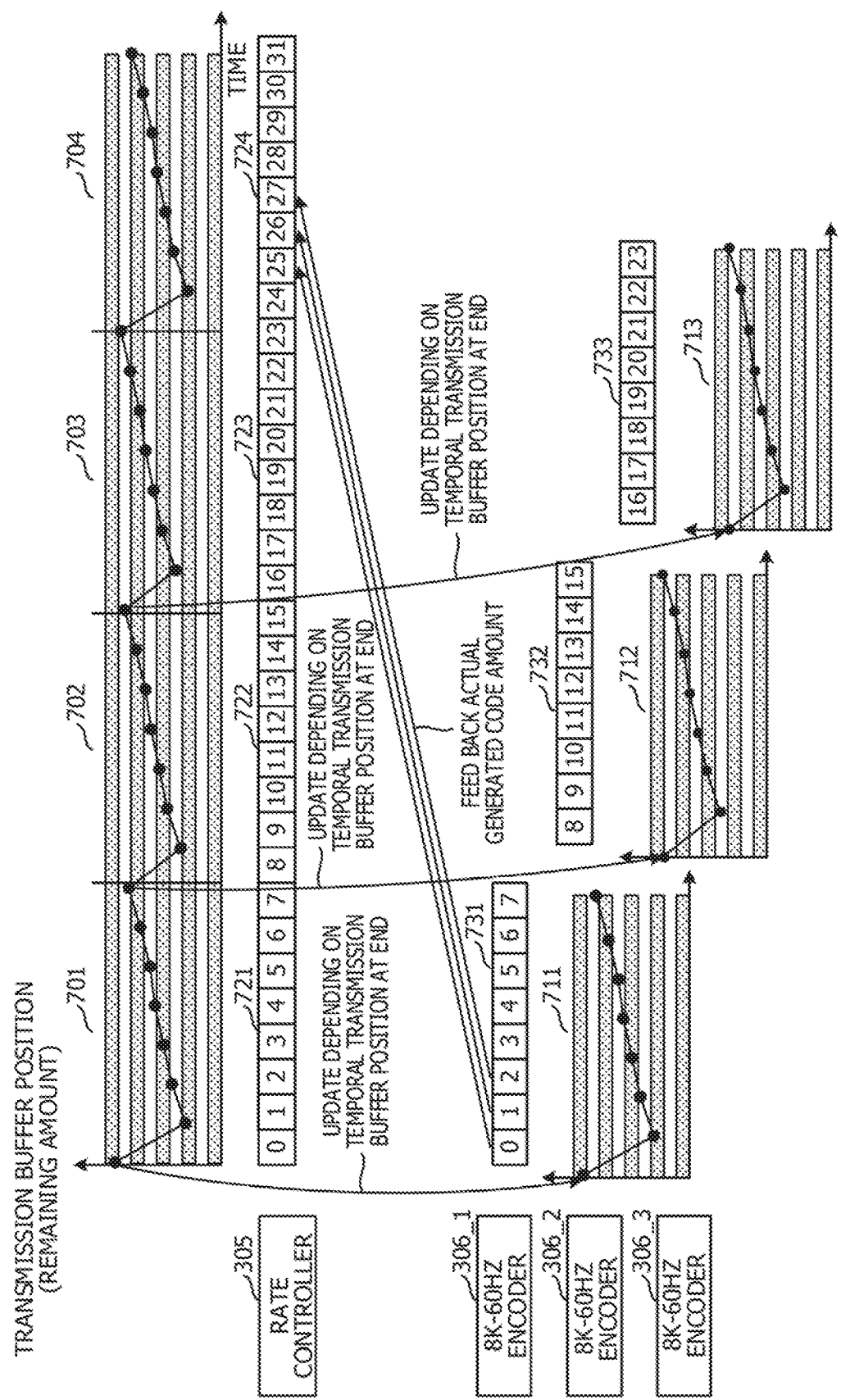
FIG. 7 is a diagram illustrating a temporal transmission buffer position and an actual transmission buffer position of each frame in the encoding processing by the moving image encoding apparatus according to the comparative example.

(1-5) Problem in Feedback Control by Moving Image Encoding Apparatus According to Comparative Example Next, a problem in the feedback control by the moving image encoding apparatus 300 according to the comparative example will be described. FIG. 7 is a diagram illustrating a temporal transmission buffer position and an actual transmission buffer position of each frame in the encoding processing by the moving image encoding apparatus according to the comparative example.

In FIG. 7, graphs 701 to 704 represent temporal transmission buffer positions of each frame included in the one SOP calculated by the rate controller 305.

The graph 701 among the graphs represents a temporal transmission buffer position of each frame included in a SOP on which the encoding processing is executed by the 8K-60 Hz encoder 306_1. The rate controller 305 calculates the temporal transmission buffer position of each frame based on a target code amount calculated for each frame 721 in the one SOP.

Each 4K-60 Hz encoder of the 8K-60 Hz encoder 306_1 executes the encoding processing based on the target code amount in units of slices calculated by the rate controller 305 and generates a bit stream 731 of each frame.

A graph 711 indicates an actual transmission buffer position of each frame that shifts by executing the encoding processing by the 8K-60 Hz encoder 306_1. The example in the graph 711 indicates a case where the actual transmission buffer position of each frame coincides with the temporal transmission buffer position. Note that the actual transmission buffer position at the head in the graph 711 is updated depending on the temporal transmission buffer position at the end of the previous SOP.

The graph 702 represents a temporal transmission buffer position of each frame included in a SOP on which the encoding processing is executed by the 8K-60 Hz encoder 306_2. The rate controller 305 calculates the temporal transmission buffer position of each frame based on the target code amount calculated for each frame 722 of one SOP.

Each 4K-60 Hz encoder of the 8K-60 Hz encoder 306_2 executes the encoding processing based on the target code amount in units of slices calculated by the rate controller 305 and generates a bit stream 732 of each frame.

A graph 712 indicates an actual transmission buffer position of each frame that shifts by executing the encoding processing by the 8K-60 Hz encoder 306_2. The example in the graph 712 indicates a case where the actual transmission buffer position of each frame coincides with the temporal transmission buffer position. Note that the actual transmission buffer position at the head in the graph 712 is updated depending on the temporal transmission buffer position at the end of the previous SOP.

The graph 703 represents a temporal transmission buffer position of each frame included in a SOP on which the encoding processing is executed by the 8K-60 Hz encoder 306_3. The rate controller 305 calculates the temporal transmission buffer position of each frame based on the target code amount calculated for each frame 723 of one SOP.

Each 4K-60 Hz encoder of the 8K-60 Hz encoder 306_3 executes the encoding processing based on the target code amount in units of slices calculated by the rate controller 305 and generates a bit stream 733 of each frame.

A graph 713 indicates an actual transmission buffer position of each frame that shifts by executing the encoding processing by the 8K-60 Hz encoder 306_3. The example in the graph 713 indicates a case where the actual transmission buffer position of each frame coincides with the temporal transmission buffer position. Note that the actual transmission buffer position at the head in the graph 713 is updated depending on the temporal transmission buffer position at the end of the previous SOP.

As described above, the rate controller 305 calculates the target code amounts and the temporal transmission buffer positions of the respective frames for three SOPs indicated in the graphs 701 to 703 in parallel. With this calculation, the 8K-60 Hz encoders 306_1 to 306_3 can execute the encoding processing in parallel.

On the other hand, it takes time to feed back, to the rate controller 305, the generated code amount of the stream generated by the 8K-60 Hz encoder through communication between apparatuses. For example, the generated code amount when the bit stream 731 is generated is fed back to the rate controller 305 at a timing when the target code amount and the temporal transmission buffer position of each frame for next three SOPs are calculated.

The example in FIG. 7 indicates that a generated code amount of a 0-th frame in the encoding order is reflected in calculation of a target code amount of a first frame in the encoding order (25-th in serial number) in each frame 724 after three SOPs.

Similarly, the example in FIG. 7 indicates that a generated code amount of the first frame in the encoding order is reflected in calculation of a target code amount of a second frame in the encoding order (26-th in serial number) in each frame 724 after three SOPs.

Similarly, the example in FIG. 7 indicates that a generated code amount of the second frame in the encoding order is reflected in calculation of a target code amount of a third frame in the encoding order (27-th in serial number) in each frame 724 after three SOPs.

In this way, in a case of the moving image encoding apparatus 300 according to the comparative example, the generated code amount is reflected to the target code amount of each frame after three SOPs from the SOP on which the encoding processing is currently executed. Therefore, if all of the generated code amount of each frame of the SOP on which the encoding processing is currently executed and the generated code amount of each frame after one or two SOPs coincide with the target code amount in units of frames, the overflow or the underflow is not generated in the transmission buffer. On the other hand, if a state is continued where the generated code amount of each frame does not coincide with the target code amount in units of frames and the generated code amount is smaller (or larger) than the buffer recovery amount, the overflow or the underflow is generated in the transmission buffer.

Figure 8:
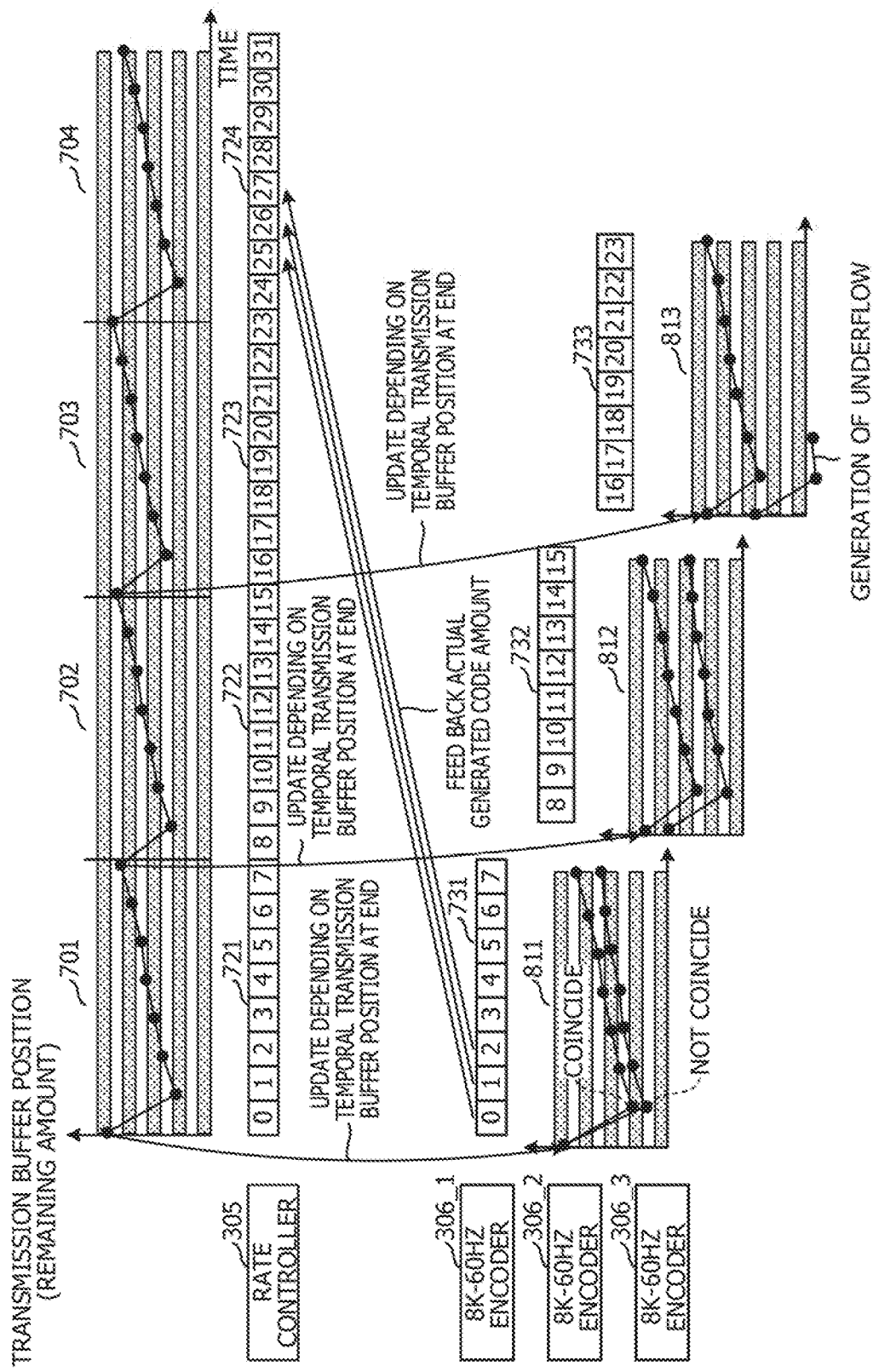
FIG. 8 is a diagram illustrating an example of generation of an underflow in the encoding processing by the moving image encoding apparatus according to the comparative example.

FIG. 8 is a diagram illustrating an example of generation of the underflow in the encoding processing by the moving image encoding apparatus according to the comparative example. In FIG. 8, in graphs 811 to 813, actual transmission buffer positions that do not coincide with the temporal transmission buffer positions of the respective frames are respectively added to the graphs 711 to 713 in FIG. 7.

According to the example in FIG. 8, as illustrated in the graph 811, before the encoding processing is executed on the 0-th frame in the encoding order in the first SOP, the temporal transmission buffer position coincides with the actual transmission buffer position. However, according to the example in FIG. 8, an error between the transmission buffer positions gradually increases by proceeding the encoding processing of each frame in the first SOP.

As a result, as illustrated in the graph 812, in the second SOP, a head temporal transmission buffer position does not coincide with a head actual transmission buffer position and the encoding processing is proceeded so that the error between both positions is further increased.

As a result, as illustrated in the graph 813, in the third SOP, the error between the head temporal transmission buffer position and the actual transmission buffer position is further increased, and the underflow is generated at the time when the encoding processing is executed on the 0-th frame in the encoding order.

In this way, in a case of the moving image encoding apparatus 300 according to the comparative example, when a state is continued where the generated code amount of each frame does not coincide with the target code amount of each frame and the generated code amount of each frame is larger or smaller than the transmission buffer recovery amount before the generated code amount is fed back, the underflow or the overflow is generated.

(2) Description of Function of Moving Image Encoding Apparatus According to First Embodiment In order to solve the problem of the moving image encoding apparatus 300 according to the comparative example, a moving image encoding apparatus 120 according to a first embodiment performs control so that a temporal transmission buffer position coincides with an actual transmission buffer position at an end of each SOP.

Figure 9:
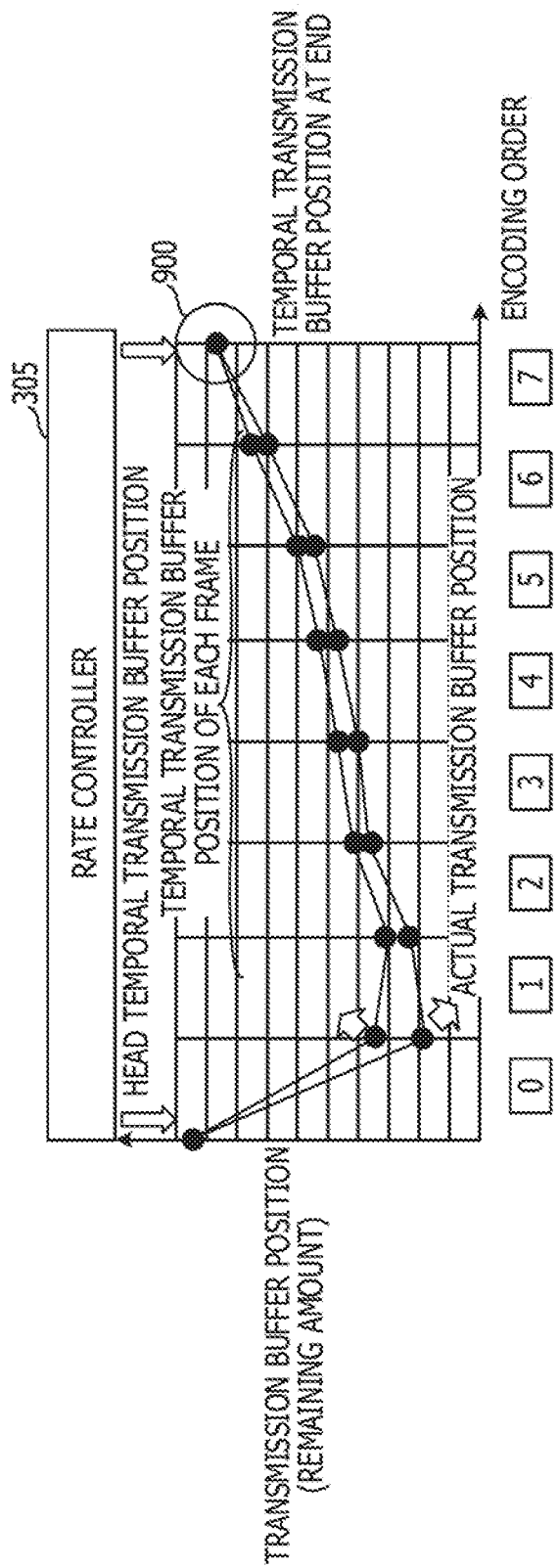
FIG. 9 is a diagram for explaining an outline of control at the time of the encoding processing by the moving image encoding apparatus according to the first embodiment from the viewpoint of the transmission buffer position.

FIG. 9 is a diagram for explaining an outline of control at the time of encoding processing by the moving image encoding apparatus according to the first embodiment from a viewpoint of the transmission buffer position. As illustrated in FIG. 9, it is assumed that an error be generated at the time when encoding processing is executed on a 0-th frame in an encoding order although a head temporal transmission buffer position of the one SOP calculated by a rate controller 305 coincides with an actual transmission buffer position.

Even in such a case, the moving image encoding apparatus 120 according to the first embodiment sequentially corrects a target code amount of a next frame each time when the encoding processing for one frame is completed so that the temporal transmission buffer position coincides with the actual transmission buffer position at the end of one SOP.

With this operation, according to the moving image encoding apparatus 120 according to the first embodiment, the temporal transmission buffer position can coincide with the actual transmission buffer position at the end of one SOP (refer to reference 900 in FIG. 9). As a result, according to the moving image encoding apparatus 120 according to the first embodiment, the errors between the SOPs do not accumulate, and it is possible to avoid the generation of the underflow or the overflow in the transmission buffer.

Note that the moving image encoding apparatus 120 according to the first embodiment corrects the target code amount in units of slices. Therefore, the moving image encoding apparatus 120 according to the first embodiment calculates a temporal transmission buffer position in units of slices, an actual transmission buffer position in units of slices, and an error in units of slices upon correcting the target code amount. Hereinafter, details of a function of the moving image encoding apparatus according to the first embodiment will be described.

Figure 10:
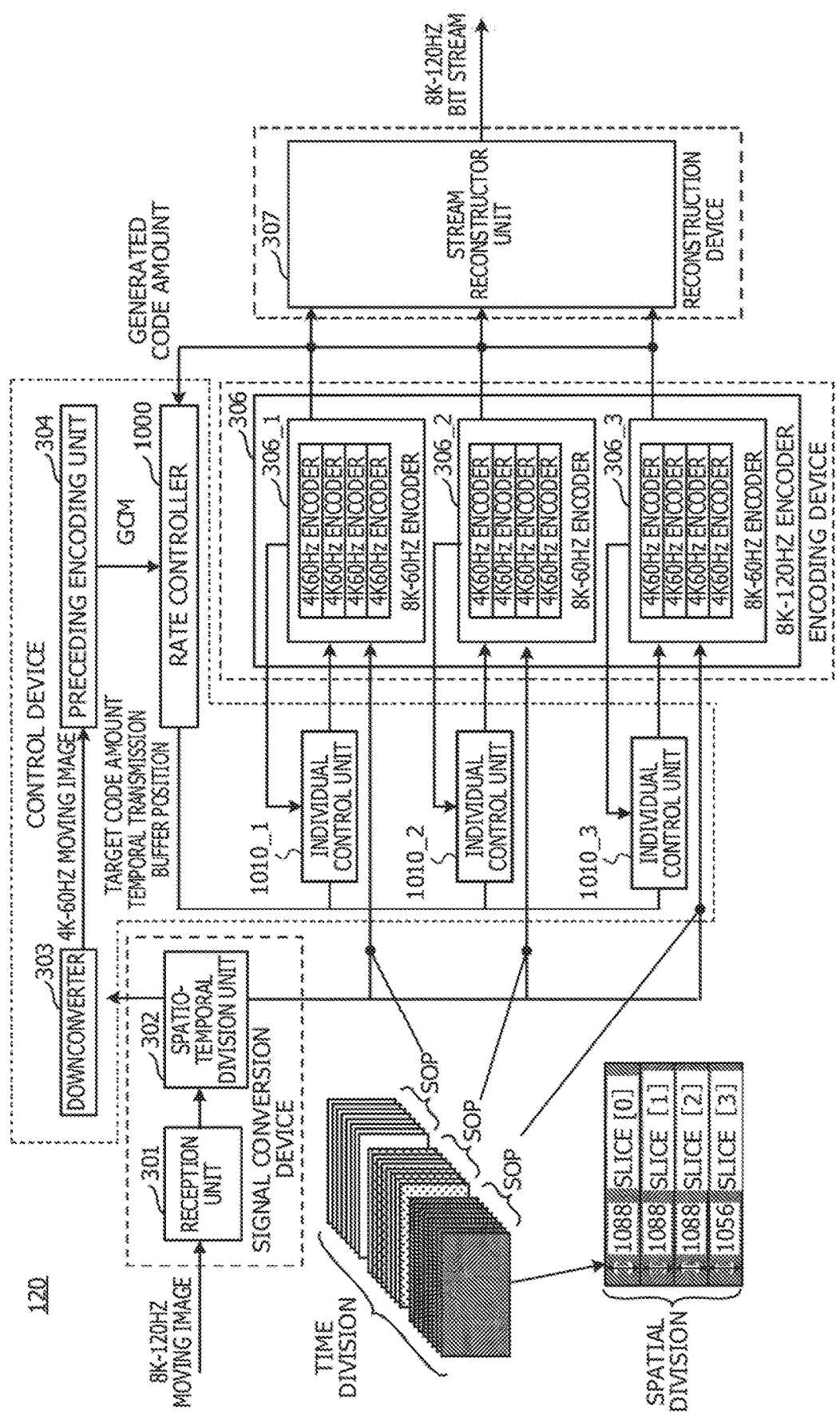
FIG. 10 is a diagram illustrating an exemplary functional configuration of the moving image encoding apparatus according to the first embodiment.

(2-1) Functional Configuration of Moving Image Encoding Apparatus According to First Embodiment First, a functional configuration of the moving image encoding apparatus 120 according to the first embodiment will be described. FIG. 10 is a diagram illustrating an exemplary functional configuration of the moving image encoding apparatus according to the first embodiment. The functional configuration of the moving image encoding apparatus according to the first embodiment is different from the functional configuration of the moving image encoding apparatus 300 according to the comparative example illustrated in FIG. 3 in a functional configuration of a control device 210.

As illustrated in FIG. 10, in a case of the moving image encoding apparatus 120 according to the first embodiment, the control device 210 functions as a downconverter 303 and a preceding encoding unit 304 by executing a moving image encoding program. Furthermore, the control device 210 functions as a rate controller 1000 and individual control units 1010_1 to 1010_3. For example, a function of the rate controller 1000 of the control device 210 and the individual control units 1010_1 to 1010_3 included in the control device 210 are different from those in FIG. 3.

The rate controller 1000 is an example of a calculation unit and has a function for notifying a temporal transmission buffer position of each frame of one SOP of the individual control units 1010_1 to 1010_3 in addition to the function of the rate controller 305 described above.

The individual control units 1010_1 to 1010_3 are examples of correction units and acquire a target code amount of each slice of each frame of one SOP and a temporal transmission buffer position of each frame of one SOP from the rate controller 1000.

Furthermore, the individual control units 1010_1 to 1010_3 acquire generated code amounts in units of slices respectively from 4K-60 Hz encoders of 8K-60 Hz encoders 306_1 to 306_3 each time when encoding processing on each slice of each frame is completed.

Furthermore, each of the individual control units 1010_1 to 1010_3 corrects a target code amount of each slice of a next frame each time when the encoding processing is executed on each slice of each frame. Furthermore, the individual control units 1010_1 to 1010_3 respectively notify the target code amounts of each slice after correction of the 4K-60 Hz encoders of the 8K-60 Hz encoders 306_1 to 306_3.

Figure 11:
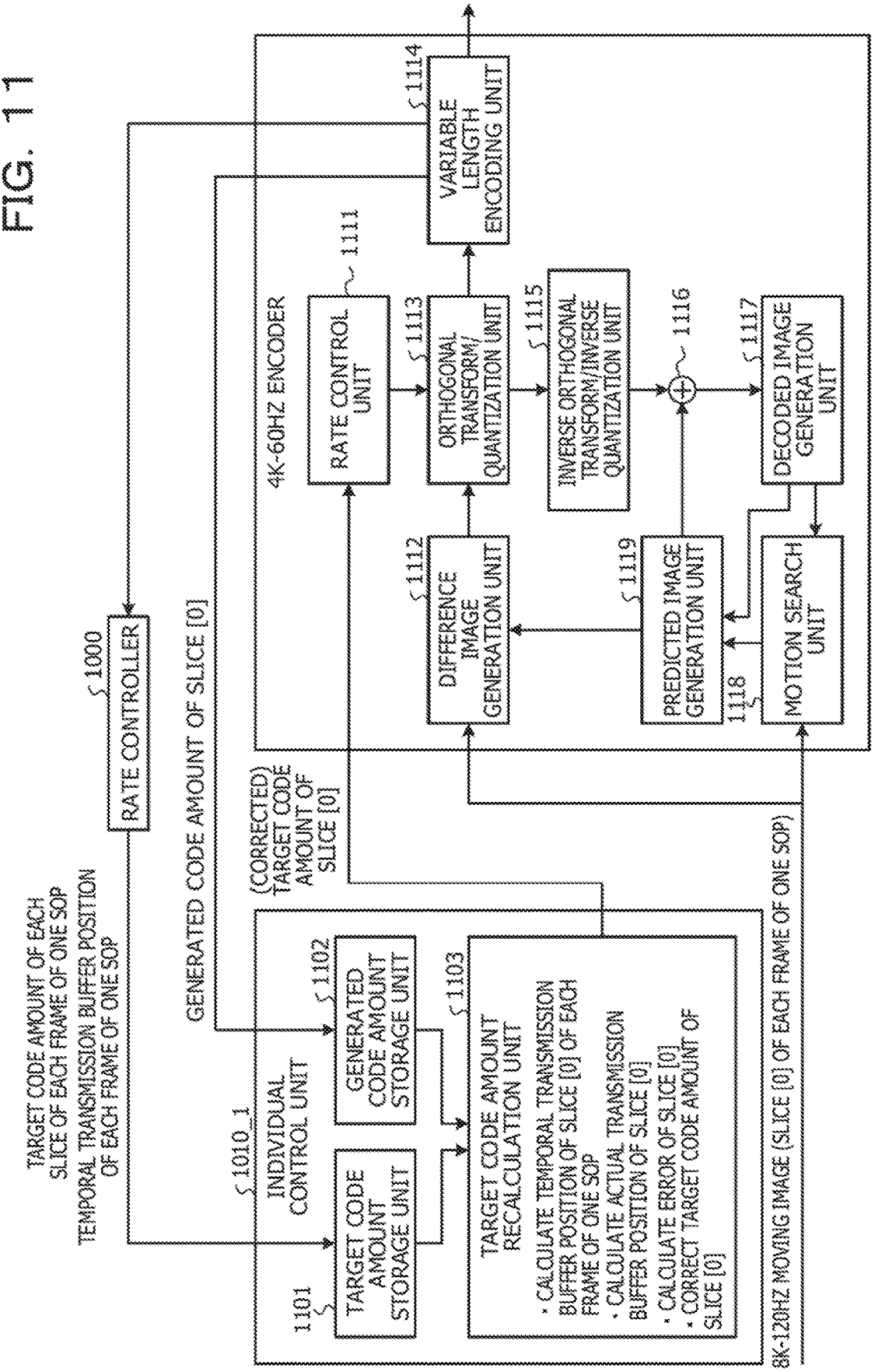
FIG. 11 is a diagram illustrating details of the functional configuration of the moving image encoding apparatus according to the first embodiment.

(2-2) Details of Functional Configuration of Moving Image Encoding Apparatus According to First Embodiment Next, details of the functional configuration of the moving image encoding apparatus 120 according to the first embodiment will be described. FIG. 11 is a diagram illustrating details of a functional configuration of the moving image encoding apparatus according to the first embodiment. However, in FIG. 11, for simplification of explanation, the rate controller 1000, the individual control unit 1010_1, and only a 4K-60 Hz encoder that executes the encoding processing on a slice [0] among the four 4K-60 Hz encoders included in the 8K-60 Hz encoder 306_1 are illustrated.

As illustrated in FIG. 11, the individual control unit 1010_1 includes a target code amount storage unit 1101, a generated code amount storage unit 1102, and a target code amount recalculation unit 1103.

The target code amount storage unit 1101 stores a target code amount of each slice of each frame of one SOP notified from the rate controller 1000. Furthermore, the target code amount storage unit 1101 stores a temporal transmission buffer position of each frame of one SOP notified from the rate controller 1000.

The generated code amount storage unit 1102 acquires and stores a generated code amount of the slice [0] of each frame from the 4K-60 Hz encoder each time when the 4K-60 Hz encoder completes the encoding processing on the slice [0] of each frame.

The target code amount recalculation unit 1103 reads the target code amount of each slice of each frame of one SOP and the temporal transmission buffer position of each frame of one SOP from the target code amount storage unit 1101 and calculates a temporal transmission buffer position of the slice [0] of each frame of one SOP. Note that "a method for calculating the temporal transmission buffer position of each slice of each frame of one SOP" will be described later in (2-3).

Furthermore, the target code amount recalculation unit 1103 reads a generated code amount of a slice [0] of a frame previous to a frame to be processed from the generated code amount storage unit 1102 and calculates an actual transmission buffer position. Note that "a method for calculating the actual transmission buffer position" will be described later in (2-4).

Furthermore, the target code amount recalculation unit 1103 calculates an error of the slice [0] based on a temporal transmission buffer position before starting the encoding processing on a slice [0] of a frame to be processed and an actual transmission buffer position before starting the encoding processing on the slice [0] of the frame to be processed. Note that "a method for calculating the error" will be described later in (2-4).

Furthermore, the target code amount recalculation unit 1103 corrects a target code amount of a slice [0] of a frame on which the encoding processing is not executed yet in the SOP by using the calculated error of the slice [0] and notifies the corrected target code amount of the slice [0] of the 4K-60 Hz encoder.

Furthermore, as illustrated in FIG. 11, the 4K-60 Hz encoder includes a rate control unit 1111, a difference image generation unit 1112, an orthogonal transform/quantization unit 1113, and a variable length encoding unit 1114. Furthermore, the 4K-60 Hz encoder includes an inverse orthogonal transform/inverse quantization unit 1115, an addition unit 1116, a decoded image generation unit 1117, a motion search unit 1118, and a predicted image generation unit 1119.

The difference image generation unit 1112 acquires a slice [0] of each frame of an 8K-120 Hz moving image from a Spatio-Temporal division unit 302 in units of SOPs. Furthermore, the difference image generation unit 1112 calculates a difference between the slice [0] of the frame to be processed and a predicted image generated by the predicted image generation unit 1119 (reference destination predetermined for each frame (FIG. 4)) and generates a prediction residual signal.

The rate control unit 1111 adjusts a quantization step based on the corrected target code amount of the slice [0] of the frame to be processed notified from the target code amount recalculation unit 1103.

The orthogonal transform/quantization unit 1113 executes orthogonal transform processing on the prediction residual signal, quantizes the prediction residual signal on which the orthogonal transform processing has been executed based on the adjusted quantization step, and generates a quantization signal.

The variable length encoding unit 1114 generates a bit stream by performing variable length encoding on the quantization signal. The variable length encoding unit 1114 outputs the generated bit stream to the stream reconstructor unit 307, the rate controller 1000, and the individual control unit 1010_1.

After inversely quantizing the quantization signal, the inverse orthogonal transform/inverse quantization unit 1115 executes inverse orthogonal transform processing.

The addition unit 1116 adds the predicted image generated by the predicted image generation unit 1119 to the signal output from the inverse orthogonal transform/inverse quantization unit 1115 so as to generate a decoded image.

The decoded image generation unit 1117 executes various filter processing on the generated decoded image and notifies the processed image of the motion search unit 1118 and the predicted image generation unit 1119.

The motion search unit 1118 acquires the slice [0] of each frame of the 8K-120 Hz moving image in units of SOPs from the Spatio-Temporal division unit 302 and performs motion compensation between the frames by using the decoded image.

The predicted image generation unit 1119 performs in-frame prediction based on the decoded image. Furthermore, the predicted image generation unit 1119 performed inter-frame prediction based on the decoded image. Moreover, the predicted image generation unit 1119 outputs either one of a predicted image obtained by performing the in-frame prediction or a predicted image obtained by performing the inter-frame prediction to the difference image generation unit 1112 and the addition unit 1116.

Figure 12:
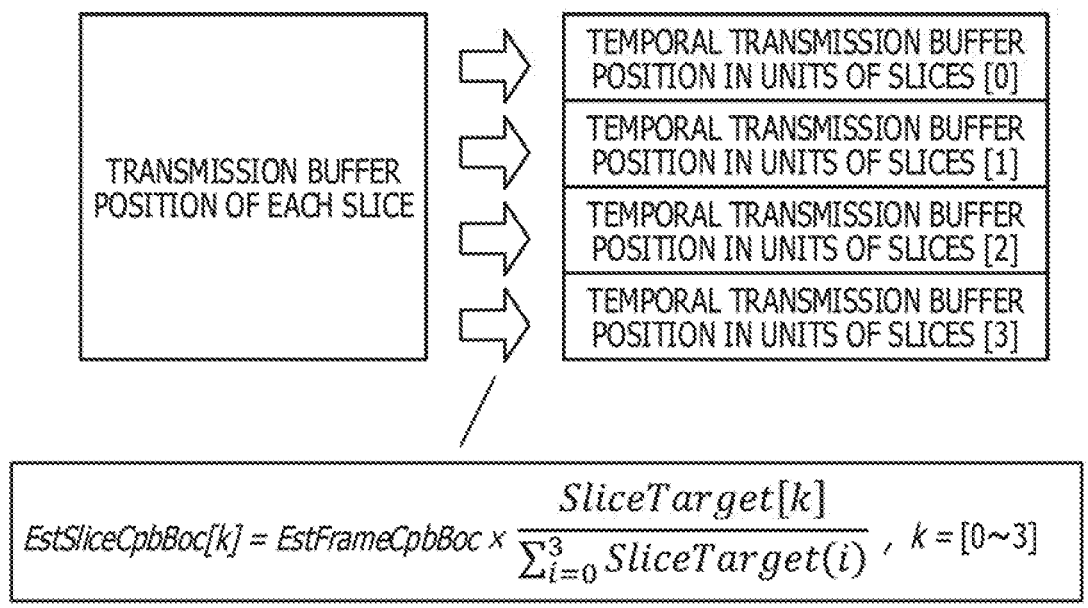
FIG. 12 is a diagram for explaining a method for calculating a temporal transmission buffer position of each slice.

(2-3) Method for Calculating Temporal Transmission Buffer Position of Each Slice Next, the method for calculating the temporal transmission buffer position of each slice of each frame included in one SOP will be described. FIG. 12 is a diagram for explaining the method for calculating the temporal transmission buffer position of each slice.

As described above, the target code amount recalculation unit 1103 reads the target code amount of each slice of each frame of the one SOP and the temporal transmission buffer position of each frame of the one SOP from the target code amount storage unit 1101. As illustrated in FIG. 12, the target code amount recalculation unit 1103 calculates the temporal transmission buffer position of each slice of each frame from the read temporal transmission buffer position of each frame based on a rate of the read target code amount of the each slice in each frame. For example, the temporal transmission buffer position of each slice of each frame is calculated based on the following expression.

[Mathematical Formula 1]

$$EstSliceCpbBoc[k] = EstFrameCpbBoc \times \frac{SliceTarget[k]}{\sum_{i=0}^{3} SliceTarget(i)},$$

$$k = [0\sim3]$$

Here, the reference k indicates a slice number and takes a value of zero to three. Furthermore, the reference SliceTarget[k] indicates a target code amount of a k-th slice. Furthermore, the reference EstFrameCpbBoc indicates a temporal transmission buffer position in units of frames, and the reference EstSliceCpbBoc[k] indicates a temporal transmission buffer position of the k-th slice.

As indicated in the above expression, the target code amount recalculation unit 1103 does not divide the temporal transmission buffer position in units of frames into four equal parts when calculating the temporal transmission buffer position in units of slices. This is because there is variation in complexity of the time-divided four slices of images (pattern). If the temporal transmission buffer position of each slice is calculated by dividing the temporal transmission buffer position in units of frames into four equal parts regardless of the variation in the complexity of the four slices of the images, it is considered that it is difficult to accurately perform rate control in units of slices. Therefore, the target code amount recalculation unit 1103 calculates the temporal transmission buffer position of each slice based on the rate of the target code amount of each slice in the frame.

(2-4) Method for Calculating Actual Transmission Buffer Position and Method for Calculating Error Next, the method for calculating the actual transmission buffer position in units of slices and the method for calculating the error in units of slices by the target code amount recalculation unit 1103 will be described.

As described above, when the actual transmission buffer position is calculated, the generated code amount and the buffer recovery amount are used. Therefore, when calculating the actual transmission buffer position in units of slices, the target code amount recalculation unit 1103 acquires a generated code amount in units of slices and a buffer recovery amount in units of slices.

Here, the target code amount recalculation unit 1103 calculates the buffer recovery amount in units of slices according to the rate of the target code amount of each slice in the frame in order to accurately perform the rate control in units of slices (refer to following expression).

[Mathematical Formula 2]

$$(R/P)_{slice[k]} = (R/P)_{frame} \times \frac{SliceTarget[k]}{\sum_{i=0}^{3} SliceTarget(i)},$$

$$k = [0\sim3]$$

In the above expression, the reference) $(R/P)_{frame}$ indicates the buffer recovery amount in units of frames, and the reference $(R/P)_{slice[k]}$ indicates a buffer recovery amount of the k-th slice.

Then, the target code amount recalculation unit 1103 calculates the actual transmission buffer position in units of slices based on the following expression by using the generated code amount in units of slices according to the buffer recovery amount in units of slices calculated based on the above expression.

[Mathematical Formula 3]

SliceCpbBoc[0]=EstSliceCpbBoc[0]

SliceCpbBoc[n]=SliceCpbBoc[n-1]-SliceBits[n-1]+ $(R/P)_{slice}[n-1]$

Here, the reference n indicates an encoding order and takes a value of one to eight. Furthermore, the reference SliceBits[n-1] indicates a generated code amount when the encoding processing is executed on a slice [0] of a (n-1)-th frame in the encoding order. Note that, as indicated in the above expression, here, it is assumed that a temporal transmission buffer position of a head slice [0] of the one SOP coincide with an actual transmission buffer position of the head slice [0] of the one SOP.

Next, the method for calculating the error in units of slices will be described. The target code amount recalculation unit 1103 calculates an error in units of slices (SliceError[n]) by using the following expression based on the temporal transmission buffer position in units of slices and the actual transmission buffer position in units of slices.

[Mathematical Formula 4]

SliceError[n]=EstSliceCpbBoc[n]-SliceCpbBoc[n]

Figure 13:
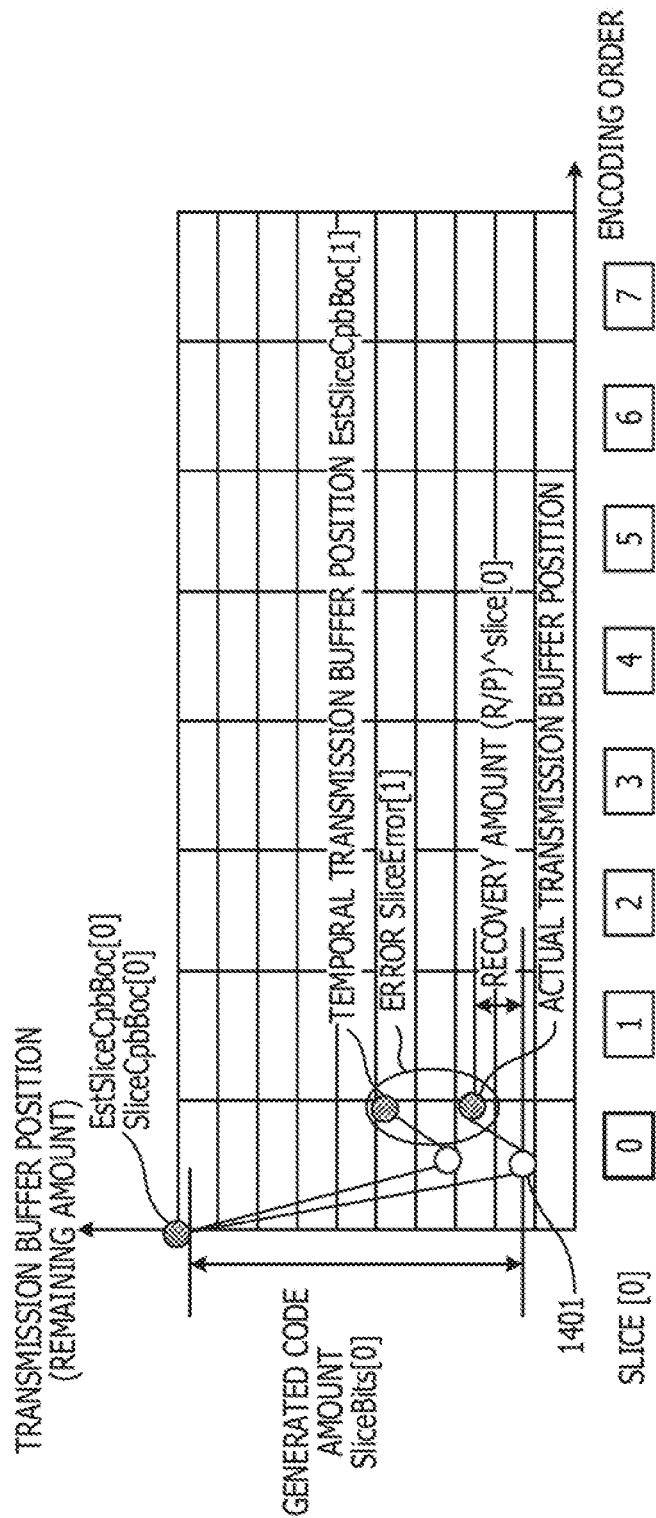
FIG. 13 is a diagram illustrating a specific example of an actual transmission buffer position of a slice [0] and a specific example of an error of the slice [0]

Next, a specific example of the actual transmission buffer position and a specific example of the error calculated by the target code amount recalculation unit 1103 will be described. FIG. 13 is a diagram illustrating a specific example of an actual transmission buffer position of the slice [0] and a specific example of an error of the slice [0], and a state is illustrated where the encoding processing is executed on a slice [0] of the 0-th frame in the encoding order and before the encoding processing on a slice [0] of a first frame in the encoding order is started.

In the example in FIG. 13, a head temporal transmission buffer position (EstSliceCpbBoc[0]) of the slice [0] coincides with a head actual transmission buffer position (SliceCpbBoc[0]) of the slice [0].

Furthermore, in the example in FIG. 13, it is assumed that a generated code amount when the encoding processing is executed on the slice [0] of the 0-th frame in the encoding order be SliceBits[0]. Therefore, when the encoding processing is executed on the slice [0] of the 0-th frame in the encoding order, the actual transmission buffer position is a position indicated by a reference 1401.

Furthermore, in the example in FIG. 13, before the encoding processing on the slice [0] of the first frame in the encoding order is started, the actual transmission buffer position of the slice [0] moves upward by $(R/P)_{slice[0]}$ that is the buffer recovery amount of the slice [0]. Therefore, in the example in FIG. 13, at the time before the encoding processing on the slice [0] of the first frame in the encoding order is started, the actual transmission buffer position of the slice [0] is SliceCpbBoc[1].

On the other hand, the target code amount recalculation unit 1103 has already calculated a temporal transmission buffer position of the slice [0] at the time before the encoding processing on the slice [0] of the first frame in the encoding order is started. For example, the target code amount recalculation unit 1103 calculates the temporal transmission buffer position (EstSliceCpbBoc[1]) of the slice [0] based on the expression indicated in (2-3) described above.

Therefore, the target code amount recalculation unit 1103 calculates the error of the slice [0] as SliceError[1]=Est-SliceCpbBoc[1]−SliceCpbBoc[1] at the time before the encoding processing on the slice [0] of the first frame in the encoding order is started.

(2-5) Method for Correcting Target Code Amount

Next, the method for correcting the target code amount in units of slices by the target code amount recalculation unit 1103 will be described. As described above, the target code amount recalculation unit 1103 corrects a target code amount of each slice of a remaining frame on which the encoding processing has not been executed yet each time when the encoding processing is executed on each slice of each frame in order to reduce the error in units of slices. Note that two correction methods will be described here as the method for correcting the target code amount of each slice by the target code amount recalculation unit 1103.

A first correction method is a method for subtracting an error, at the time when the encoding processing is executed on a slice [0] of a frame previous to the frame to be processed and before the encoding processing on the slice [0] of the frame to be processed is started, from a target code amount of the slice [0] of the frame to be processed.

According to the first correction method, by executing the encoding processing on the slice [0] of the frame to be processed, the error at the time before the encoding processing on the slice [0] of the frame to be processed is started can be reduced.

However, in a case of the first correction method, there is a problem in that there is a possibility that the target code amount of the slice [0] of the frame to be processed becomes zero if the error to be subtracted is large.

On the other hand, a second correction method is a method for distributing the error to a target code amount of a slice [0] of each remaining frame on which the encoding processing has not been executed yet so that the target code amount of the slice [0] of the frame to be processed does not become zero.

For example, the target code amount recalculation unit 1103 calculates SliceTarget'[m+1] that is the target code amount of the slice [0] of each frame after the error distribution based on the following expression (m represents encoding order of frame previous to frame to be processed).

$$SliceTarget'[m+1] = SliceTarget[m+1] - SliceError[m] \times \frac{SliceTarget[m+1]}{\sum_{i=m+1}^{7} SliceTarget(i)}$$ [Mathematical Formula 5]

Figure 14:
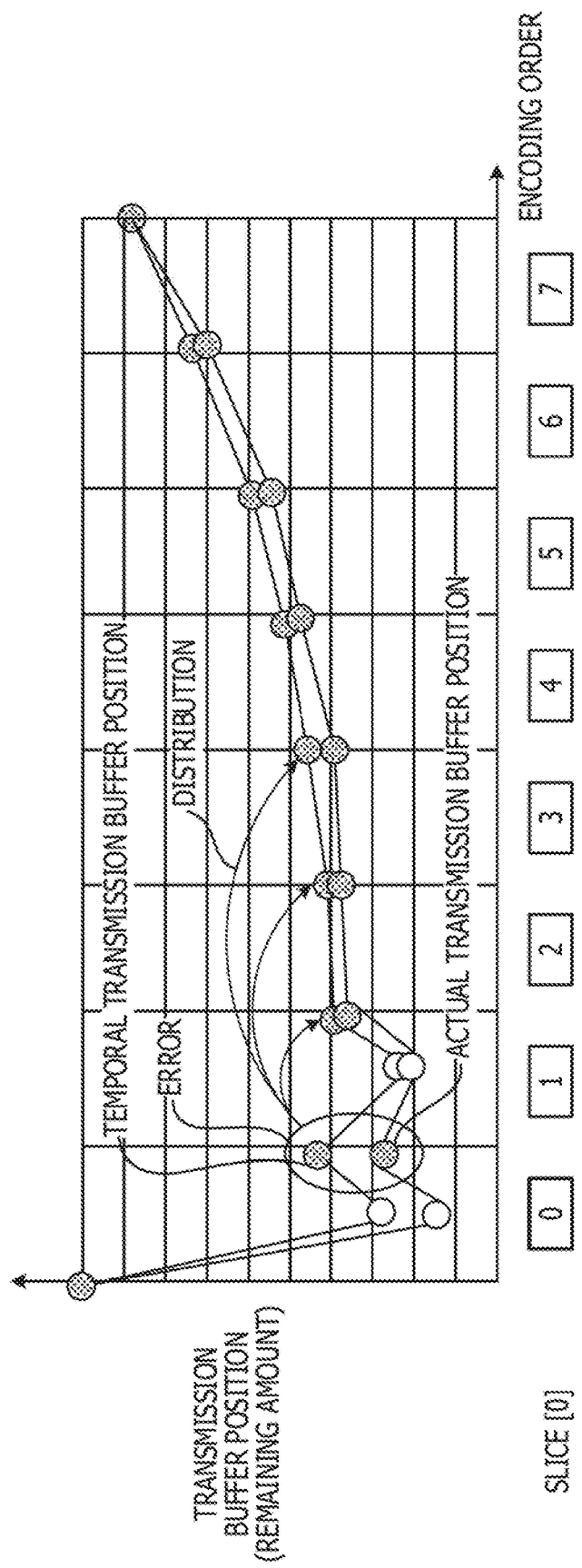
FIG. 14 is a diagram illustrating a second correction method of a target code amount in units of slices.

The second correction method will be described in detail with reference to FIG. 14. FIG. 14 is a diagram illustrating the second correction method of the target code amount in units of slices. The target code amount recalculation unit 1103 distributes the calculated error of the slice [0] to the target code amount of the slice [0] of each remaining frame on which the encoding processing has not been executed among the frames in the one SOP as illustrated in FIG. 14. With this operation, according to the second correction method, the temporal transmission buffer position of the slice [0] can coincide with the actual transmission buffer position at the end of one SOP, and it is possible to avoid that the target code amount of the slice [0] of the remaining frame becomes zero.

(2-6) Specific Example of Target Code Amount Correction Processing

Figure 15B:
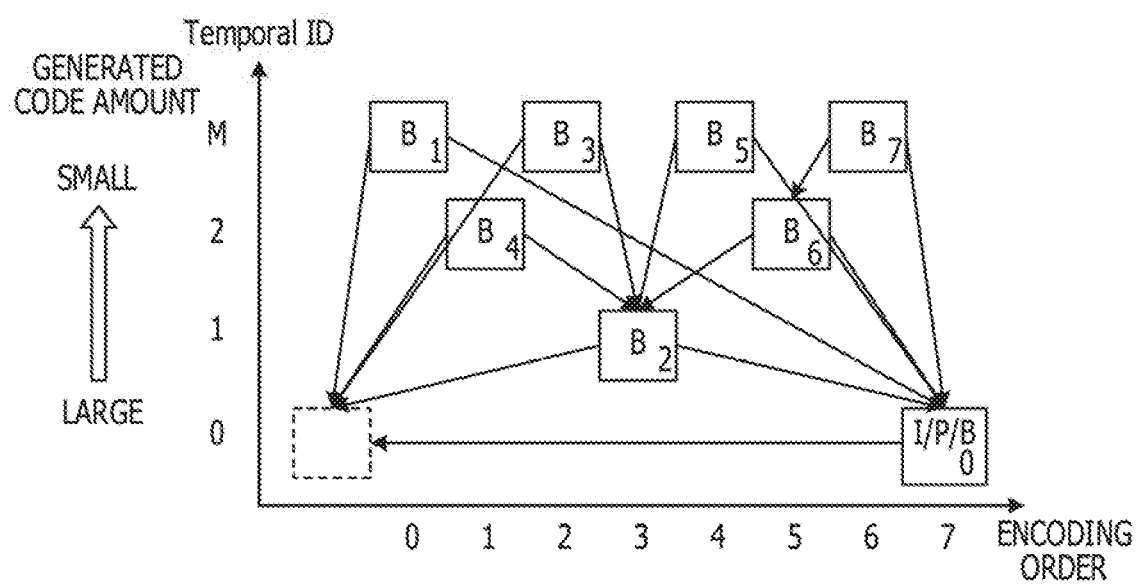

Next, a specific example of correction processing by the second correction method of the target code amount in units of slices by the target code amount recalculation unit 1103 will be described. FIGS. 15A and 15B are first diagrams illustrating the specific example of the correction processing by the second correction method of the target code amount in units of slices. In FIGS. 15A and 15B, FIG. 15A illustrates a specific example of correction processing of a target code amount in a case of m=3.

As illustrated in FIG. 15A, it is assumed that the error of the slice [0] be SliceError[3] at the time when the encoding processing is executed on a third frame in the encoding order and before the encoding processing on a fourth frame in the encoding order as a frame to be processed is started.

On the other hand, it is assumed that a target code amount of a slice [0] of the fourth frame in the encoding order calculated by the target code amount recalculation unit 1103 be SliceTarget[4]. Furthermore, it is assumed that target code amounts of slices [0] of a fifth, a sixth, and seventh frames in the encoding order calculated by the target code amount recalculation unit 1103 be respectively SliceTarget [5] to SliceTarget[7].

In this case, for example, SliceTarget'[4] that is the corrected target code amount of the slice [0] of the fourth frame in the encoding order is calculated by SliceTarget[4]−SliceError[3]×(SliceTarget[4]/(sum of SliceTarget[5] to SliceTarget[7])).

Note that SliceTarget'[5] to SliceTarget'[7] that are corrected target code amounts of the slice [0] of the fifth to the seventh frames in the encoding order are calculated by a similar method.

FIG. 15B is a diagram illustrating a relationship between the display order, the encoding order, and the generated code amount. As illustrated in FIG. 15B, the 0-th, second, fourth, and sixth frames in the display order (first, third, fifth, and seventh frames in encoding order) have small generated code amounts upon the encoding processing. On the other hand, the third and seventh frames in the display order (0-th and second frames in encoding order) have large generated code amounts upon the encoding processing.

As described above, the generated code amount is different for each encoding order. Therefore, an encoding order of a frame of a distribution destination is needed to be considered when the errors are distributed. On the other hand, according to the second correction method, the errors are distributed according to the rate between the target code amounts of the slices [0] of the remaining frames. For example, according to the second correction method, the errors can be distributed so as to decrease a subtraction amount for the frame that originally has a small target code amount and increase the subtraction amount for the frame that originally has a large target code amount. As a result, according to the second correction method, it is possible to realize appropriate correction in consideration of the encoding order of the frame of the distribution destination.

Figure 16:
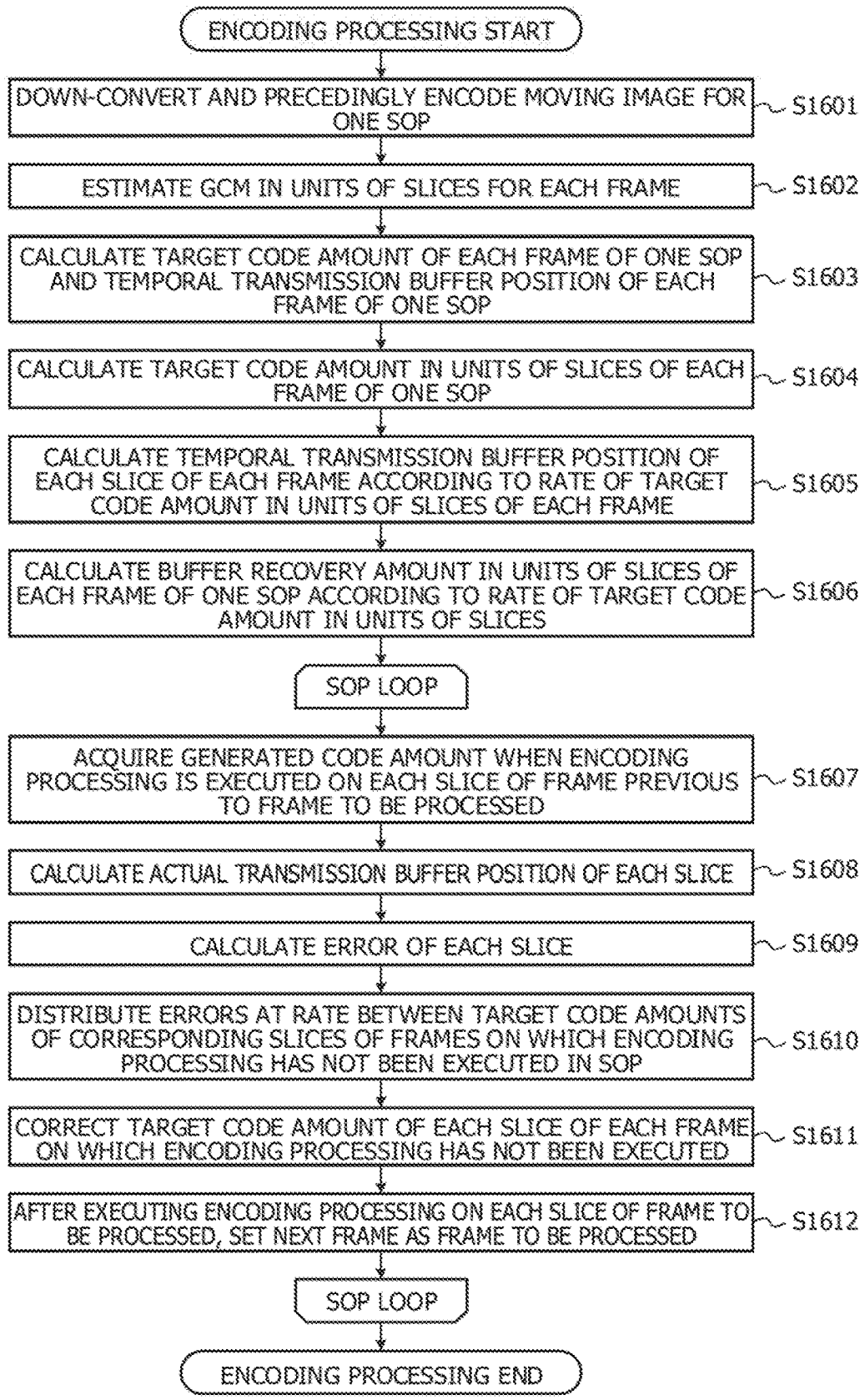
FIG. 16 is a flowchart illustrating a flow of the encoding processing by the moving image encoding apparatus according to the first embodiment.

(2-7) Flow of Encoding Processing by Moving Image Encoding Apparatus According to First Embodiment Next, an overall flow of encoding processing by the moving image encoding apparatus 120 according to the first embodiment will be described. FIG. 16 is a flowchart illustrating a flow of encoding processing by the moving image encoding apparatus according to the first embodiment.

In step S1601, the reception unit 301 receives an 8K-120 Hz moving image for one SOP, and the downconverter 303 down-converts the moving image for one SOP and generates a 4K-60 Hz moving image. Furthermore, the preceding encoding unit 304 executes preceding encoding processing on the down-converted moving image.

In step S1602, the preceding encoding unit 304 calculates a GCM in units of slices of each frame included in the one SOP of the 4K-60 Hz moving image based on the result of the preceding encoding processing. Moreover, the preceding encoding unit 304 estimates a GCM in units of slices of each frame included in the one SOP of the 8K-120 Hz moving image based on the calculated GCM in units of slices.

In step S1603, the rate controller 1000 calculates a target code amount of each frame of one SOP of the 8K-120 Hz moving image and calculates a temporal transmission buffer position of each frame of the one SOP.

In step S1604, the rate controller 1000 calculates a target code amount in units of slices of each frame of the one SOP of the 8K-120 Hz moving image.

In step S1605, each of the individual control units 1010_1 to 1010_3 calculates a temporal transmission buffer position of each slice of each frame of the one SOP according to the rate of the target code amount of each slice in the frame.

In step S1606, each of the individual control units 1010_1 to 1010_3 calculates a buffer recovery amount in units of slices of each frame of the one SOP according to the rate of the target code amount of each slice in the frame.

In step S1607, each of the individual control units 1010_1 to 1010_3 acquires a generated code amount of each slice when each 4K-60 Hz encoder executes the encoding processing on each slice of a frame previous to the frame to be processed.

In step S1608, each of the individual control units 1010_1 to 1010_3 calculates an actual transmission buffer position of each slice at the time before the encoding processing on each slice of the frame to be processed is started based on the acquired generated code amount of each slice.

In step S1609, each of the individual control units 1010_1 to 1010_3 calculates errors of the slices at the time before the encoding processing on each slice of the frame to be processed is started.

In step S1610, each of the individual control units 1010_1 to 1010_3 distributes the errors of the slices calculated in step S1609 at a rate between the target code amounts of the corresponding slices of the frames on which the encoding processing has not been executed yet in the SOP.

In step S1611, each of the individual control units 1010_1 to 1010_3 corrects the target code amount of each slice of each frame on which the encoding processing is not executed based on the distributed error.

In step S1612, each 4K-60 Hz encoder executes the encoding processing on each slice of the frame to be processed based on the corrected target code amount of each slice. Furthermore, the individual control units 1010_1 to 1010_3 set a frame next to the frame on which the encoding processing is executed as the frame to be processed.

Note that each processing in steps S1607 to S1612 is executed on all the frames included in one SOP, and when each processing is executed on all the frames in one SOP, the encoding processing for one SOP is completed.

As is obvious from the above description, the moving image encoding apparatus 120 according to the first embodiment down-converts the 8K-120 Hz moving image and precedingly performs encoding for each SOP so as to calculate the target code amount of each slice of each frame of one SOP. Furthermore, the moving image encoding apparatus 120 according to the first embodiment calculates the errors between the actual transmission buffer position and the temporal transmission buffer position in units of slices, each time when the encoding processing is executed in units of slices, for each frame included in one SOP. Moreover, the moving image encoding apparatus 120 according to the first embodiment distributes the calculated errors in units of slices based on the rate of the target code amounts of the corresponding slices of the frames on which the encoding processing has not been executed yet in one SOP and corrects the target code amount in units of slices.

With this operation, the moving image encoding apparatus 120 according to the first embodiment may coincide the temporal transmission buffer position with the actual transmission buffer position at the time when the encoding processing is executed on the frame at the end of one SOP.

As a result, according to the moving image encoding apparatus 120 according to the first embodiment, it is possible to avoid the generation of the underflow or the overflow in the transmission buffer.

Second Embodiment

In the first embodiment, description has been made as assuming that, when the temporal transmission buffer position in units of slices is calculated from the temporal transmission buffer position in units of frames, the rate of the target code amount of each slice in the frame be used. However, the target code amount of each slice is sequentially corrected as the encoding processing is proceeded in one SOP. Therefore, in a second embodiment, when the temporal transmission buffer position of each slice is calculated, a rate of the corrected target code amount of each slice in the frame is used.

Furthermore, in the first embodiment, description has been made as assuming that, when the buffer recovery amount in units of slices is calculated, the rate of the target code amount of each slice in the frame be used. However, the target code amount of each slice is sequentially corrected as the encoding processing is proceeded in one SOP. Therefore, in the second embodiment, when the buffer recovery amount in units of slices is calculated, a rate of the corrected target code amount of each slice in the frame is used.

Hereinafter, the second embodiment will be described focusing on differences from the first embodiment.

(1) Method for Calculating Temporal Transmission Buffer Position of Each Slice

First, a method for calculating the temporal transmission buffer position of each slice will be described. As described above in the first embodiment, each time when the encoding processing is executed on each slice of each frame, a target code amount recalculation unit 1103 calculates an error in units of slices. Then, the target code amount recalculation unit 1103 corrects a target code amount of each slice of each frame on which the encoding processing has not been executed yet in the SOP.

On the other hand, as described in the first embodiment, the target code amount recalculation unit 1103 reads a target code amount of each slice of each frame of one SOP and a temporal transmission buffer position of each frame of one SOP from a target code amount storage unit 1101 and calculates the temporal transmission buffer position of each slice based on the rate of the target code amount of each slice in the frame.

At this time, in the second embodiment, in a case where the target code amount of each slice is corrected, the temporal transmission buffer position of each slice is calculated by using the rate of the corrected target code amount of each slice in the frame. For example, the temporal transmission buffer position of each slice is calculated based on the following expression.

$$EstSliceCpbBoc[k] = \\ EstFrameCpbBoc \times \frac{SliceTarget'[k]}{\sum_{i=0}^{3} SliceTarget'(i)},$$

$$k = [0 \sim 3]$$

[Mathematical Formula 6]

(2) Method for Calculating Buffer Recovery Amount in Units of Slices

Next, a method for calculating the buffer recovery amount in units of slices will be described. As described above in the first embodiment, each time when the encoding processing is executed on each slice of one frame, the target code amount recalculation unit 1103 calculates an error in units of slices. Then, the target code amount recalculation unit 1103 corrects a target code amount of each slice of each frame on which the encoding processing has not been executed yet in the SOP.

On the other hand, as described in the first embodiment, the target code amount recalculation unit 1103 calculates the buffer recovery amount in units of slices in each frame according to the rate of the target code amount of each slice in the frame.

At this time, in the second embodiment, in a case where the target code amount of each slice is corrected, the buffer recovery amount of each slice is calculated by using the rate of the corrected target code amount of each slice in the frame. For example, the buffer recovery amount of each slice is calculated based on the following expression.

$$(R/P)_{slice[k]} = \\ (R/P)_{frame} \times \frac{SliceTarget'[k]}{\sum_{i=0}^{3} SliceTarget'(i)},$$

$$k = [0 \sim 3]$$

[Mathematical Formula 7]

Figure 17B:
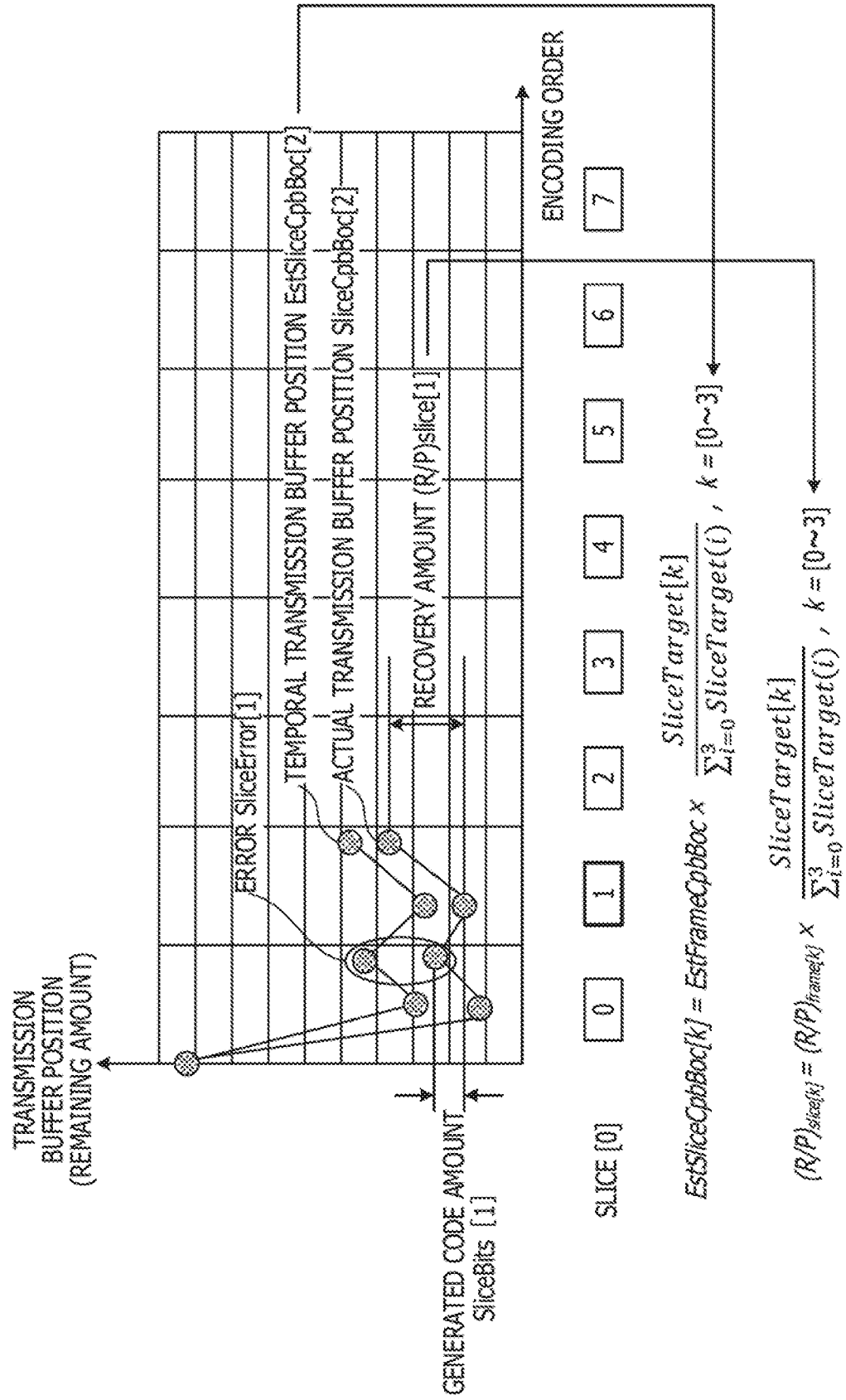

(3) Specific Example of Temporal Transmission Buffer Position And Specific Example of Actual Transmission Buffer Position Next, a specific example of a temporal transmission buffer position of a slice [0] and a specific example of an actual transmission buffer position of the slice [0] will be described. FIGS. 17A and 17B are diagrams illustrating the specific example of the temporal transmission buffer position of the slice [0] and the specific example of the actual transmission buffer position of the slice [0].

In FIG. 17A illustrates a transmission buffer position before the encoding processing on a slice [0] of a first frame in an encoding order is started. Here, a head temporal transmission buffer position (EstSliceCpbBoc[0]) of the slice [0] coincides with a head actual transmission buffer position (SliceCpbBoc[0]) of the slice [0].

Therefore, at the time of FIG. 17A, • when calculating the temporal transmission buffer position (EstSliceCpbBoc[1]) of the slice [0], the target code amount recalculation unit 1103 uses a rate of a target code amount of each slice in a 0-th frame in the encoding order. • When calculating the actual transmission buffer position (SliceCpbBoc[1]) of the slice [0], the target code amount recalculation unit 1103 uses a buffer recovery amount $(R/P)_{slice[0]}$ based on the rate of the target code amount of each slice in the 0-th frame in the encoding order.

On the other hand, FIG. 17B illustrates a transmission buffer position before the encoding processing on a slice [0] of a second frame in the encoding order is started. Here, since an error (SliceError[1]) is generated at the time before the encoding processing on the slice [0] of the first frame in the encoding order is started, the target code amount of the slice [0] of the first frame in the encoding order is corrected.

Therefore, at the time of FIG. 17B, • when calculating the temporal transmission buffer position (EstSliceCpbBoc[2]) of the slice [0], the target code amount recalculation unit 1103 uses the rate of the corrected target code amount of each slice in the first frame in the encoding order. • When calculating the actual transmission buffer position (SliceCpbBoc[2]) of the slice [0], the target code amount recalculation unit 1103 uses a buffer recovery amount $(R/P)_{slice[1]}$ based on the rate of the corrected target code amount of each slice in the first frame in the encoding order.

Figure 18:
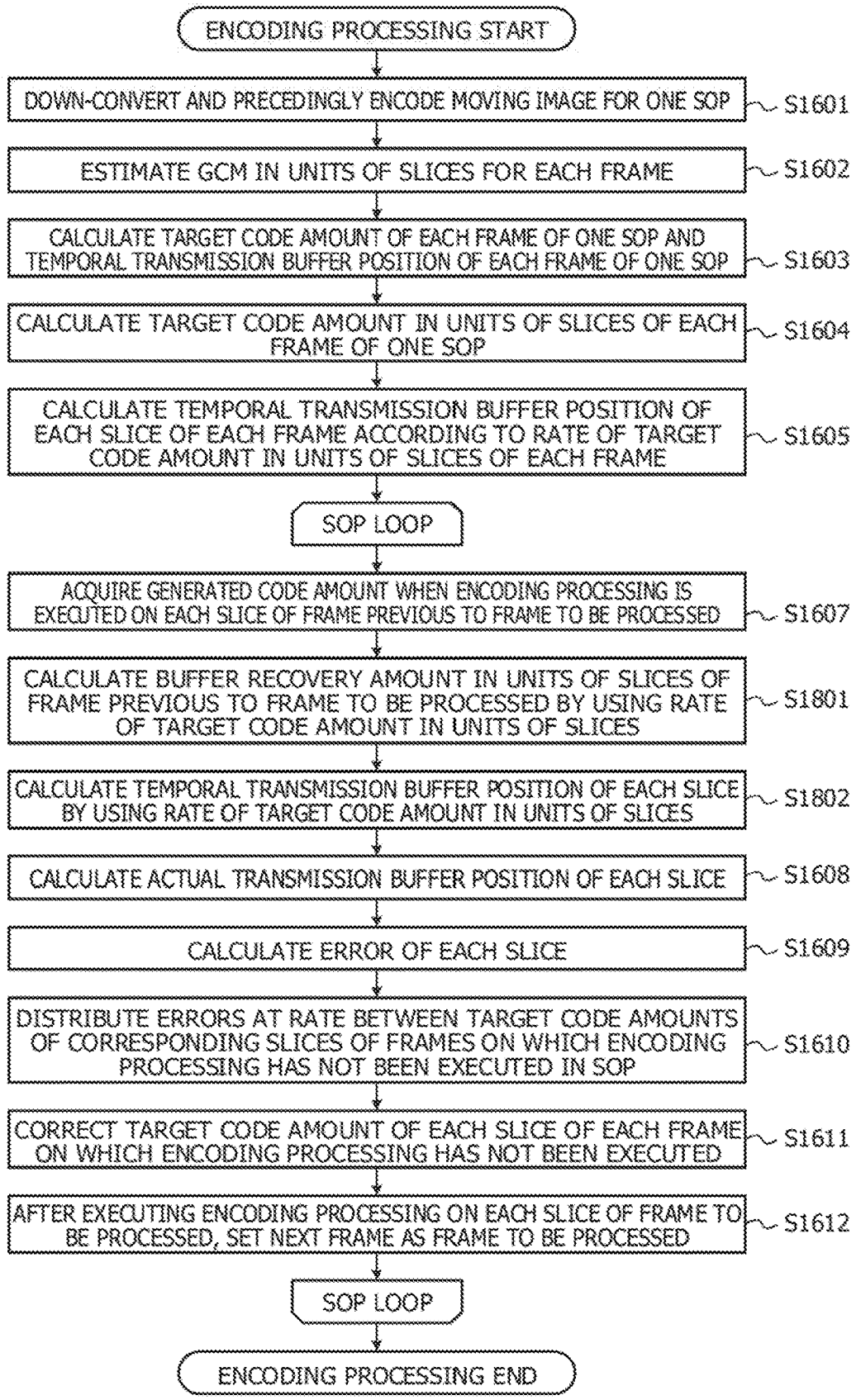
FIG. 18 is a flowchart illustrating a flow of encoding processing by a moving image encoding apparatus according to a second embodiment.

(4) Flow of Encoding Processing by Moving Image Encoding Apparatus According to Second Embodiment Next, an overall flow of encoding processing by the moving image encoding apparatus 120 according to the second embodiment will be described. FIG. 18 is a flowchart illustrating a flow of encoding processing by the moving image encoding apparatus according to the second embodiment. A difference from the encoding processing described with reference to FIG. 16 is steps S1801 and S1802.

In step S1801, the individual control units 1010_1 to 1010_3 calculate a buffer recovery amount in units of slices of a frame previous to the frame to be processed by using the rate of the target code amount of each slice in the frame. At this time, in a case where the target code amount in units of slices of the frame to be processed is corrected, the individual control units 1010_1 to 1010_3 calculate the buffer recovery amount by using the rate of the corrected target code amount of each slice in the frame.

In step S1802, the individual control units 1010_1 to 1010_3 calculate the temporal transmission buffer position of each slice at the time before the encoding processing on each slice of the frame to be processed is started by using the rate of the target code amount of each slice in the frame. At this time, in a case where the target code amount in units of slices is corrected, the individual control units 1010_1 to 1010_3 calculate the temporal transmission buffer position for each slice by using the rate of the corrected target code amount of each slice in the frame.

As is obvious from the above description, when calculating the temporal transmission buffer position of each slice, the moving image encoding apparatus according to the second embodiment uses the rate of the corrected target code amount of each slice in the frame. Furthermore, when calculating the buffer recovery amount in units of slices, the moving image encoding apparatus according to the second embodiment uses the rate of the corrected target code amount of each slice in the frame.

As a result, according to the moving image encoding apparatus according to the second embodiment, it is possible to more accurately calculate the error between the temporal transmission buffer position and the actual transmission buffer position.

Third Embodiment

In the first and second embodiments, description has been made as assuming that the correction of the target code amount be performed on each slice of all the remaining frames on which the encoding processing is not executed in the SOP. On the other hand, as described above, each frame in the SOP has a different generated code amount for each hierarchy.

Therefore, if the target code amount of each slice of the frame having a small generated code amount (deep frame in hierarchy) is corrected when the error between the temporal transmission buffer position and the actual transmission buffer position is large, there is a possibility that the corrected target code amount of each slice becomes zero.

Therefore, in the third embodiment, the correction of the target code amount is performed on each slice of a shallow frame in the hierarchy from among the remaining frames on which the encoding processing has not been executed in the SOP. Hereinafter, the third embodiment will be described focusing on differences from the first and second embodiments.

Figure 19:
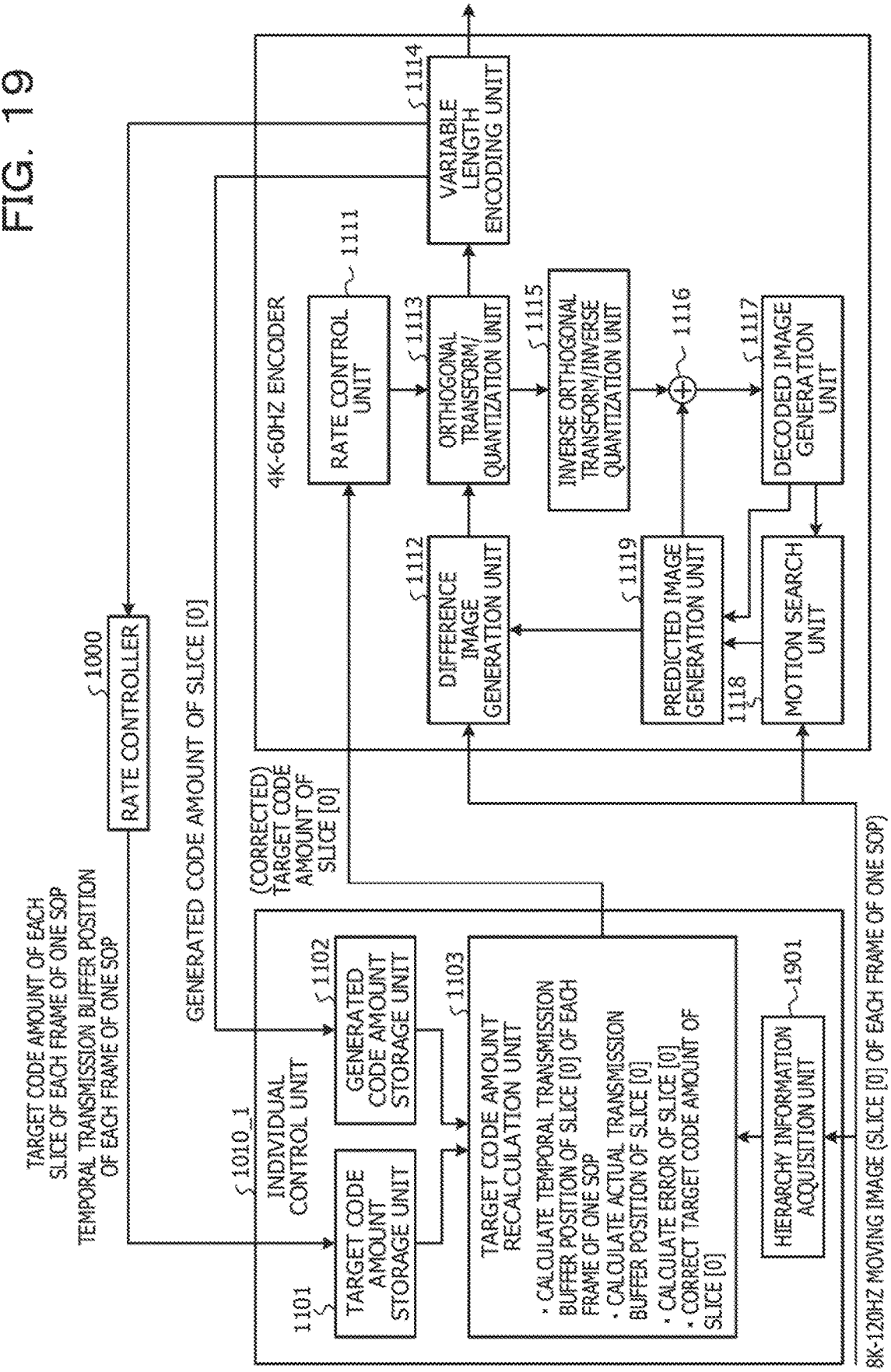
FIG. 19 is a diagram illustrating details of a functional configuration of a moving image encoding apparatus according to a third embodiment.

(1) Details of Functional Configuration of Moving Image Encoding Apparatus According to Third Embodiment First, details of a functional configuration of a moving image encoding apparatus 120 according to the third embodiment will be described. FIG. 19 is a diagram illustrating details of a functional configuration of a moving image encoding apparatus according to the third embodiment. As in FIG. 10, in FIG. 19, a rate controller 1000, an individual control unit 1010_1, and only a 4K-60 Hz encoder that executes the encoding processing on a slice [0] among four 4K-60 Hz encoders included in an 8K-60 Hz encoder 306_1 are illustrated.

A difference from FIG. 10 is a point that the individual control unit 1010_1 includes a hierarchy information acquisition unit 1901. The hierarchy information acquisition unit 1901 acquires a slice [0] of each frame of an 8K-120 Hz moving image in units of SOPs by a Spatio-Temporal division unit 302. Furthermore, the hierarchy information acquisition unit 1901 notifies a slice [0] of a frame in a predetermined encoding order (for example, even-numbered frame in encoding order) from among acquired slices [0] of the respective frames of a target code amount recalculation unit 1103. This is because, since the even-numbered frame in the encoding order is shallow in the hierarchy, in a case where the encoding processing is executed on the slice [0] of the frame, the generated code amount is large.

Figure 20A:
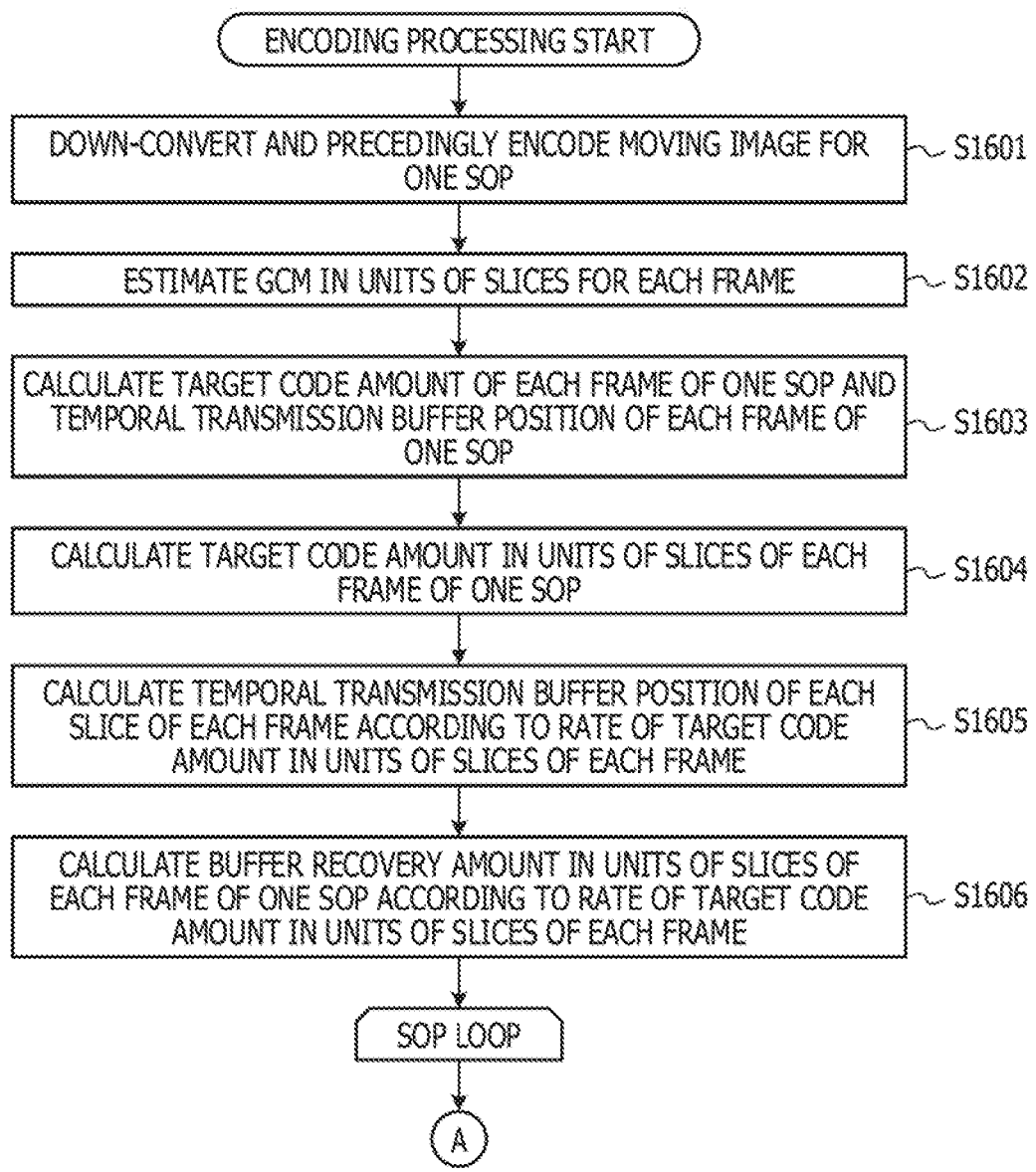

(2) Flow of Encoding Processing by Moving Image Encoding Apparatus According to Third Embodiment Next, a flow of the encoding processing by the moving image encoding apparatus 120 according to the third embodiment will be described. FIGS. 20A and 20B are a flowchart illustrating a flow of encoding processing by the moving image encoding apparatus according to the third embodiment. A difference from the encoding processing described with reference to FIG. 16 is steps S2001 and S2002.

In step S2001, the individual control units 1010_1 to 1010_3 distribute errors of the respective slices calculated in step S1609 at a rate between the target code amounts of corresponding slices of the respective frames that are shallow in the hierarchy on which the encoding processing has not been executed yet in the SOP.

In step S2002, the individual control units 1010_1 to 1010_3 correct a target code amount of each slice of the frame that is shallow in the hierarchy on which the encoding processing has not been executed yet in the SOP based on the distributed error of each slice.

As is obvious from the above description, the moving image encoding apparatus according to the third embodiment performs the correction of the target code amount on each slice of the frame that is shallow in the hierarchy among the remaining frames on which the encoding processing has not been executed.

As a result, according to the moving image encoding apparatus according to the third embodiment, it is possible to appropriately correct the target code amount in units of slices.

Fourth Embodiment

In the first embodiment, it has been described that the errors are distributed according to the rate between the target code amounts of the corresponding slices of the remaining frames when the target code amount in units of slices of the remaining frames on which the encoding processing has not been executed yet in the SOP is corrected.

However, the remaining frames include a frame that is shallow in the hierarchy and a frame that is deep in the hierarchy. More frames refer to the frame that is shallow in the hierarchy at the time of the encoding processing (hereinafter, such a frame is referred to as reference frame). On the other hand, the frame that is deep in the hierarchy is not referred from the other frame at the time of the encoding processing (hereinafter, such a frame is referred to as non-reference frame).

Generally, in the encoding processing, by improving an image quality of the reference frame, an image quality of an entire moving image is improved. Therefore, in a fourth embodiment, a correction amount is adjusted according to whether or not the frame is the reference frame when a target code amount of each slice of a remaining frame on which the encoding processing has not been executed yet is corrected. Hereinafter, the fourth embodiment will be described focusing on differences from the first embodiment.

Figure 21A:
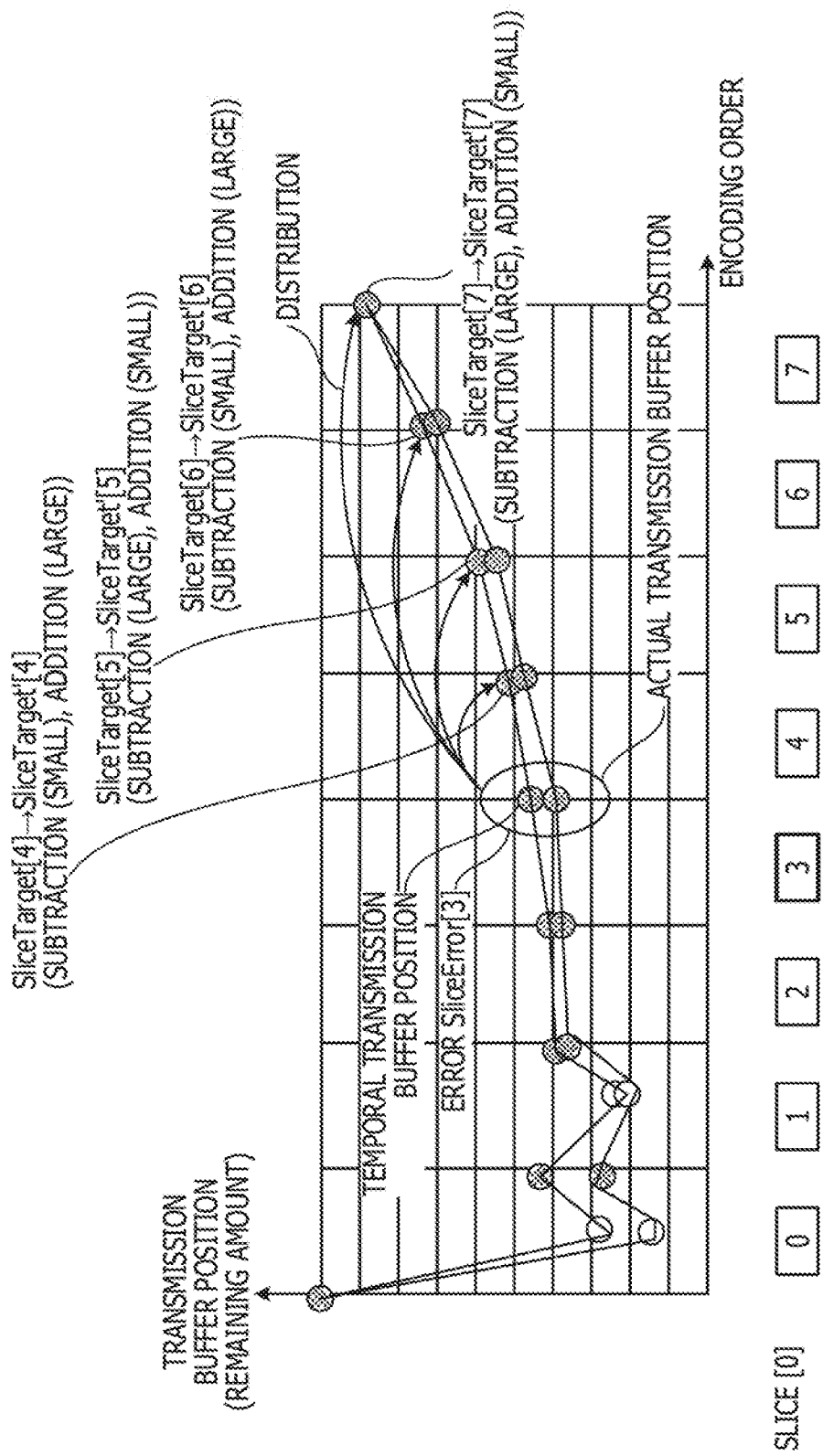
FIGS. 21A and 21B are second diagrams illustrating a specific example of the correction processing by using the second correction method of the target code amount in units of slices.
Figure 21B:
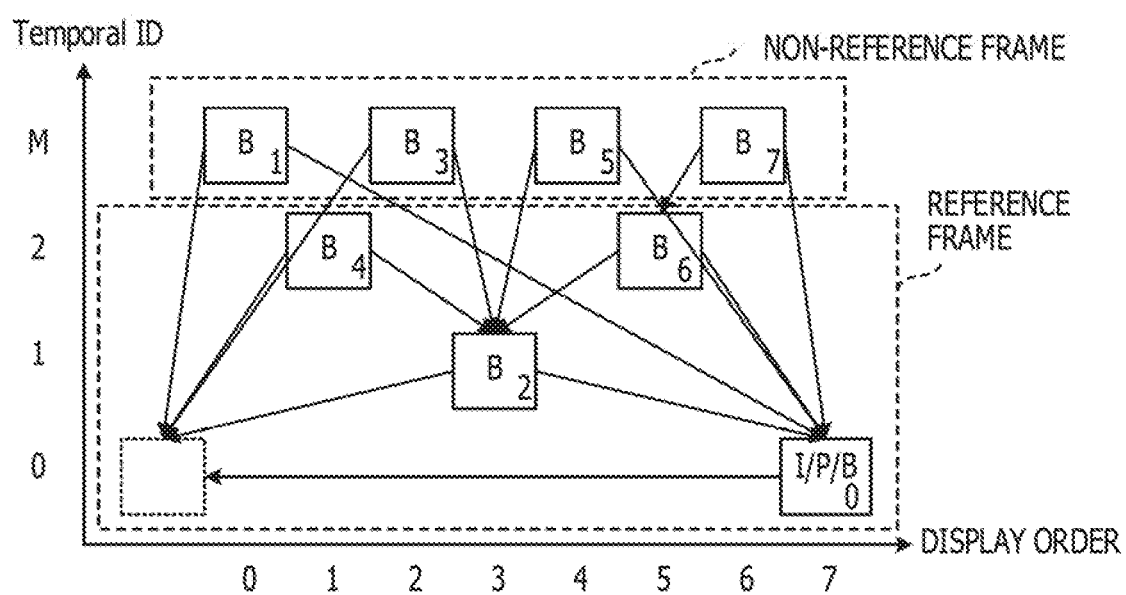

FIGS. 21A and 21B are second diagrams illustrating a specific example of correction processing by a second correction method of a target code amount in units of slices. As illustrated in FIG. 21A, it is assumed that an error of a slice [0] be SliceError[3] at the time when the encoding processing is executed on a third frame in the encoding order and before the encoding processing on a fourth frame in the encoding order is started.

On the other hand, it is assumed that a target code amount of a slice [0] of the fourth frame in the encoding order calculated by the target code amount recalculation unit 1103 be SliceTarget[4]. Furthermore, it is assumed that target code amounts of slices [0] of a fifth, sixth, and seventh frames in the encoding order calculated by the individual control unit 1010_1 be respectively SliceTarget[5] to SliceTarget[7].

Here, as illustrated in FIG. 21B, out of the fourth to seventh frames in the encoding order, the fourth and sixth frames are reference frames, and the fifth and seventh frames are non-reference frames.

Therefore, in a case where the target code amount is subtracted when correcting the target code amount of the slice [0] of the fourth frame and the target code amount of the slice [0] of the sixth frame, the target code amount recalculation unit 1103 reduces error distribution. For example, after multiplying a rate of the target code amount by a correction coefficient less than one, the target code amount of the slice [0] is corrected.

Furthermore, in a case where the target code amount is added when correcting the target code amount of the slice [0] of the fourth frame and the target code amount of the slice [0] of the sixth frame, the target code amount recalculation unit 1103 increases the error distribution. For example, after multiplying the rate of the target code amount by a correction coefficient equal to or more than one, the target code amount of the slice [0] is corrected.

Furthermore, in a case where the target code amount is subtracted when correcting the target code amount of the slice [0] of the fifth frame and the target code amount of the slice [0] of the seventh frame, the target code amount recalculation unit 1103 increases the error distribution. For example, after multiplying the rate of the target code amount by a correction coefficient equal to or more than one, the target code amount of the slice [0] is corrected.

Furthermore, in a case where the target code amount is added when correcting the target code amount of the slice [0] of the fifth frame and the target code amount of the slice [0] of the seventh frame, the target code amount recalculation unit 1103 reduces the error distribution. For example, after multiplying a rate of the target code amount by a correction coefficient less than one, the target code amount of the slice [0] is corrected.

As is obvious from the above description, the moving image encoding apparatus according to the fourth embodiment adjusts the correction amount according to whether or not the frame is a reference frame when correcting the target code amount in units of slices of the remaining frame on which the encoding processing has not been executed yet in the SOP.

As a result, according to the moving image encoding apparatus according to the fourth embodiment, it is possible to improve an image quality of a decoded moving image.

[Other Embodiment] In the first to fourth embodiments, description has been made as assuming that each of the 8K-60 Hz encoders 306_1 to 306_3 includes four 4K-60 Hz encoders. Furthermore, in the first to fourth embodiments, description has been made as assuming that each of the four 4K-60 Hz encoders executes the encoding processing for one slice of each frame for one SOP of the 8K-120 Hz moving image.

However, each of the 8K-60 Hz encoders 306_1 to 306_3 may execute the encoding processing on each frame for one SOP of the 8K-120 Hz moving image. In this case, the Spatio-Temporal division unit 302 performs only time division, and it is not needed for the Spatio-Temporal division unit 302 to perform space division.

For example, in the first to fourth embodiments, description has been made as assuming that a processing unit of the encoding processing is one slice. However, the processing unit of the encoding processing may be one frame. For example, the individual control units 1010_1 to 1010_3 may calculate the error between the actual transmission buffer position and the temporal transmission buffer position in units of frames each time when the encoding processing is executed on the frame to be processed. Furthermore, the individual control units 1010_1 to 1010_3 may correct the target code amount of each remaining frame on which the encoding processing has not been executed in the SOP based on the error in units of frames. As a result, an effect similar to that in a case where the target code amount is corrected in units of slices may be obtained.

Furthermore, in the first to fourth embodiments, an encoding method when the 4K-60 Hz encoder executes the encoding processing has not been particularly mentioned. However, any encoding method may be used (for example, encoding method may be H.265/HEVC or H.264/MPEG4 AVC).

Note that the present embodiment is not limited to the configurations and the like described here, and may include combinations of the configurations or the like described in the above embodiments with other elements, and the like. These points can be changed without departing from the spirit of the present embodiment, and can be appropriately determined according to application modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory and configured to:
   down-convert a moving image in units of structure of pictures (SOPs) divided in a time direction and precedingly execute encoding processing;
   calculate a target code amount of each processing unit included in the moving image in units of SOPs based on a result of the preceding encoding processing and calculate a temporal buffer position in a case where the encoding processing is executed on each processing unit based on the calculated target code amount;
   calculate an error between an actual transmission buffer position and a temporal buffer position each time when the encoding processing is executed on each processing unit in the moving image in units of SOPs and correct a target code amount of each processing unit on which the encoding processing has not been executed yet;
   down-convert a moving image divided in the time direction and the spatial direction and precedingly execute the encoding processing so as to estimate a global complexity measure of each slice of each frame included in the moving image in units of SOPs; and calculate a target code amount of each frame based on the estimated global complexity measure of each slice of each frame and calculates a temporal buffer position of each frame based on the calculated target code amount of each frame;

calculate a target code amount of each slice of each frame based on the estimated global complexity measure of each slice of each frame; and calculate a temporal buffer position of each slice based on the temporal buffer position of each frame and a rate of a target code amount of each slice in the frame;

calculate an actual buffer position of each slice based on the generated code amount of each slice acquired each time when the encoding processing is executed on each slice and a buffer recovery amount of each slice;

calculate an error of each slice based on the calculated temporal buffer position of each slice and the calculated actual buffer position of each slice; and correct target code amounts of corresponding slices in each frame on which the encoding processing has not been executed yet by distributing errors between the corresponding slices based on the rate of the target code amounts of the corresponding slices for each frame on which the encoding processing has not been executed yet in the moving image in units of SOPs, the processing unit is a slice obtained by dividing each frame included in the moving image in units of SOPs in a spatial direction.

2. The information processing apparatus according to claim 1, wherein the processor is configure to: correct the target code amount of each processing unit on which the encoding processing has not been executed yet by distributing the error to the target code amount of each processing unit based on a rate of the target code amount of each processing unit on which the encoding processing has not been executed yet in the moving image in units of SOPs.

3. The information processing apparatus according to claim 1, wherein the processor is configured to: correct the target code amount of each processing unit on which the encoding processing has not been executed yet by distributing the error to the target code amount of each processing unit based on a rate of the target code amount of each processing unit on which the encoding processing has not been executed yet and a hierarchy of each processing unit on which the encoding processing has not been executed yet in the moving image in units of SOPs.

4. The information processing apparatus according to claim 1, wherein the processing unit is a frame included in the moving image in units of SOPs.

5. The information processing apparatus according to claim 1, wherein the processor is configured to: calculate the temporal buffer position of each slice based on the temporal buffer position of each frame calculated by the calculation unit and a rate of the corrected target code amount of each slice in the frame.

6. The information processing apparatus according to claim 1, wherein the processor is configured to: calculate the buffer recovery amount of each slice based on the rate of the corrected target code amount of each slice in the frame.

7. The information processing apparatus according to claim 1, wherein the processor is configured to: correct target code amounts of corresponding slices in a frame in a predetermined encoding order by distributing errors between the corresponding slices based on a rate of the target code amounts of the corresponding slices for a frame in a predetermined encoding order among the each frames, on which the encoding processing has not been executed yet, in the moving image in units of SOPs.

8. The information processing apparatus according to claim 1, wherein the processor is configured to: correct target code amounts of corresponding slices in each frame on which the encoding processing has not been executed yet by multiplying a correction coefficient which is different depending on whether or not a frame is a reference frame and performing distribution when errors between the corresponding slices are distributed based on the rate of the target code amounts of the corresponding slices for each frame on which the encoding processing has not been executed yet in the moving image in units of SOPs.

9. A moving image encoding method for causing a computer to execute processing comprising:

down-converting a moving image in units of structure of pictures (SOPs) divided in a time direction and precedingly executing encoding processing;

calculating a target code amount of each processing unit included in the moving image in units of SOPs based on a result of the preceding encoding processing and calculating a temporal buffer position in a case where the encoding processing is executed on each processing unit based on the calculated target code amount; and calculating an error between an actual transmission buffer position and a temporal buffer position each time when the encoding processing is executed on each processing unit in the moving image in units of SOPs and correcting a target code amount of each processing unit on which the encoding processing has not been executed yet;

down-converting a moving image divided in the time direction and the spatial direction and precedingly execute the encoding processing so as to estimate a global complexity measure of each slice of each frame included in the moving image in units of SOPs;

calculating a target code amount of each frame based on the estimated global complexity measure of each slice of each frame and calculates a temporal buffer position of each frame based on the calculated target code amount of each frame;

calculating a target code amount of each slice of each frame based on the estimated global complexity measure of each slice of each frame;

calculating a temporal buffer position of each slice based on the temporal buffer position of each frame and a rate of a target code amount of each slice in the frame;

calculating an actual buffer position of each slice based on the generated code amount of each slice acquired each time when the encoding processing is executed on each slice and a buffer recovery amount of each slice;

calculating an error of each slice based on the calculated temporal buffer position of each slice and the calculated actual buffer position of each slice; and correcting target code amounts of corresponding slices in each frame on which the encoding processing has not been executed yet by distributing errors between the corresponding slices based on the rate of the target code amounts of the corresponding slices for each frame on which the encoding processing has not been executed yet in the moving image in units of SOPs, the processing unit is a slice obtained by dividing each frame included in the moving image in units of SOPs in a spatial direction.

10. A non-transitory computer-readable recording medium having stored therein a moving image encoding program for causing a computer to execute a process comprising:

down-converting a moving image in units of structure of pictures (SOPs) divided in a time direction and precedingly executing encoding processing;

calculating a target code amount of each processing unit included in the moving image in units of SOPs based on a result of the preceding encoding processing and calculating a temporal buffer position in a case where the encoding processing is executed on each processing unit based on the calculated target code amount; and calculating an error between an actual transmission buffer position and a temporal buffer position each time when the encoding processing is executed on each processing unit in the moving image in units of SOPs and correcting a target code amount of each processing unit on which the encoding processing has not been executed yet;

down-converting a moving image divided in the time direction and the spatial direction and precedingly execute the encoding processing so as to estimate a global complexity measure of each slice of each frame included in the moving image in units of SOPs;

calculating a target code amount of each frame based on the estimated global complexity measure of each slice of each frame and calculates a temporal buffer position of each frame based on the calculated target code amount of each frame;

calculating a target code amount of each slice of each frame based on the estimated global complexity measure of each slice of each frame;

calculating a temporal buffer position of each slice based on the temporal buffer position of each frame and a rate of a target code amount of each slice in the frame;

calculating an actual buffer position of each slice based on the generated code amount of each slice acquired each time when the encoding processing is executed on each slice and a buffer recovery amount of each slice;

calculating an error of each slice based on the calculated temporal buffer position of each slice and the calculated actual buffer position of each slice; and correcting target code amounts of corresponding slices in each frame on which the encoding processing has not been executed yet by distributing errors between the corresponding slices based on the rate of the target code amounts of the corresponding slices for each frame on which the encoding processing has not been executed yet in the moving image in units of SOPs, the processing unit is a slice obtained by dividing each frame included in the moving image in units of SOPs in a spatial direction.

\* \* \* \* \*